United States Patent
Ishihara

(10) Patent No.: US 8,765,068 B2
(45) Date of Patent: Jul. 1, 2014

(54) HONEYCOMB STRUCTURAL BODY AND ELECTRICAL HEATED CATALYST DEVICE

(75) Inventor: Mikio Ishihara, Anjo (JP)

(73) Assignee: Denso Corporation, Kariya (JP)

( * ) Notice: Subject to any disclaimer, the term of this patent is extended or adjusted under 35 U.S.C. 154(b) by 245 days.

(21) Appl. No.: 13/238,333

(22) Filed: Sep. 21, 2011

(65) Prior Publication Data

US 2012/0076698 A1    Mar. 29, 2012

(30) Foreign Application Priority Data

Sep. 27, 2010  (JP) ................................. 2010-215962
May 30, 2011   (JP) ................................. 2011-120957

(51) Int. Cl.
    *B01D 50/00*        (2006.01)
(52) U.S. Cl.
    USPC ......................................................... 422/174
(58) Field of Classification Search
    None
    See application file for complete search history.

(56) References Cited

U.S. PATENT DOCUMENTS

| 5,200,154 A | 4/1993 | Harada et al. |
| 5,245,825 A | 9/1993 | Ohhashi et al. |
| 5,446,264 A | 8/1995 | Kondo et al. |
| 5,670,746 A * | 9/1997 | Hashimoto et al. ........... 174/651 |
| 5,680,503 A | 10/1997 | Abe et al. |
| 2013/0045137 A1 * | 2/2013 | Sakashita et al. ............. 422/174 |

FOREIGN PATENT DOCUMENTS

| JP | 4-067588 | 3/1992 |
| JP | 4-280086 | 10/1992 |
| JP | 4-280087 | 10/1992 |
| JP | 7-166845 | 6/1995 |
| JP | 3001281 | 1/2000 |
| JP | 2010-106735 | 5/2010 |
| WO | WO 2011125816 A1 * | 10/2011 |

OTHER PUBLICATIONS

First Office Action issued for Chinese Patent Application No. 201110291495.4, dated Oct. 28, 2013 (with translation).

* cited by examiner

*Primary Examiner* — Tom Duong
(74) *Attorney, Agent, or Firm* — Nixon & Vanderhye PC

(57) ABSTRACT

A honeycomb structural body has a honeycomb body and a pair of electrodes. The honeycomb body has a cell formation part and an outer skin part of a cylindrical hollow shape. The electrodes are formed on an outer peripheral surface of the outer skin part so that the electrodes face to each other in a diameter direction of the honeycomb body. Each of the electrodes has a reference electrode part formed at a central part of the electrode and one or more outside electrode parts formed at both ends of the reference electrode part. The reference electrode parts of the electrode face to each other. The outside electrode parts of the electrodes face to each other. An electrical resistivity of the reference electrode part is smaller than an electrical resistivity of each of the outside electrode parts in each of the electrodes.

8 Claims, 12 Drawing Sheets

HONEYCOMB STRUCTURAL BODY AND ELECTRICAL HEATED CATALYST DEVICE

CROSS-REFERENCE TO RELATED APPLICATION

This application is related to and claims priority from Japanese Patent Applications No. 2010-215962 filed on Sep. 27, 2010, and No. 2011-120957 filed on May 30, 2011, the contents of which are hereby incorporated by reference.

BACKGROUND OF THE INVENTION

1. Field of the Invention

The present invention relates to honeycomb structural bodies mounted to exhaust gas purifying systems in order to purify exhaust gas emitted from internal combustion engines, and relates to electrically heated catalyst (EHC) devices equipped with the honeycomb structural body.

2. Description of the Related Art

In general, a catalyst device is mounted to an exhaust gas pipe of an exhaust gas purifying system through which exhaust gas emitted from an internal combustion engine of a motor vehicle flows and purified. The catalyst device is capable of purifying exhaust gas. In general, such a catalyst device uses a honeycomb structural body which supports catalyst such as platinum (Pt), palladium (Pd), rhodium (Rh), etc., therein.

By the way, it is necessary to heat the catalyst supported in the catalyst device at approximately 400° C. in order to adequately activate the catalyst. In order to achieve this, there is a conventional technique, an electrically heated catalyst (EHC) device having a honeycomb structural body equipped with a pair of a positive electrode and a negative electrode. The positive and negative electrodes are formed on the outer peripheral surface of the honeycomb structural body. When electrical power is supplied to the positive and negative electrodes, current flows in the honeycomb structural body, and heat energy is generated in the honeycomb structural body.

For example, Japanese patent laid open publication No. 2010-106735 has disclosed a honeycomb structural body having a cylindrical shape on which a pair of a positive electrode and a negative electrode is formed on the outer circumferential surface thereof. When a honeycomb structural body has a cylindrical shape (namely, whose cross section perpendicular to an axial direction of the honeycomb structural body has a circular shape), a distance between the positive electrode and the negative electrode forming the electrode pair is changed according to a portion of the electrodes, namely, not constant. This electrode structure causes a problem of it being difficult for the current to flow through a long distance between the electrode pair (for example, a distance at the central parts between the positive electrode and the negative electrode) when compared with the current flowing through a short distance at the end parts between the positive electrode and the negative electrode (for example, a distance at the outside portion between the positive electrode and the negative electrode). This causes non-uniform temperature distribution in the inside of the honeycomb structural body because of causing unbalanced temperature distribution in the inside of the honeycomb structural body.

In order to solve the above conventional problem, there is a conventional technique disclosed in Japanese patent laid open publication No. H04-67588. This conventional technique provides a honeycomb structural body of a cylindrical shape having a heater part and a slit part. The slit part is formed in the honeycomb structural body and adjusts the electrical resistance in the honeycomb structural body.

Further, there is other conventional technique, disclosed in Japanese patent laid open publication No. H04-280086, which provides a honeycomb structural body equipped with a honeycomb monolith heater. In particular, a cross section of the honeycomb structural body, which is perpendicular to an axial direction of the honeycomb structural body, has a square shape or a race-track shape in order to have the same distance between the electrode pair.

However, the honeycomb structural body with the electrodes disclosed in Japanese patent laid open publication No. H04-67588 has a long electrical path because of having the slit part in order to adjust the electrical resistance. This structure causes a difficulty of increasing the temperature of the honeycomb structural body as soon as electrical power is supplied.

Further, this conventional honeycomb structural body has a possibility of decreasing the entire strength and the capability of purifying exhaust gas because of having the slit part in the honeycomb structural body.

Because the honeycomb structural body with the honeycomb monolith heater disclosed in Japanese patent laid open publication No. H04-280086 has a square shape or a race-track shape, there is a possibility of it being difficult to mount it in an exhaust gas pipe of a motor vehicle. That is, the structure of this conventional honeycomb structural body has a drawback on mounting it to the exhaust gas pipe in the exhaust gas purifying system for the internal combustion engine of a motor vehicle.

SUMMARY OF THE INVENTION

It is an object of the present invention to provide a honeycomb structural body and an electrically heated catalyst (EHC) device equipped with the honeycomb structural body which is capable of being easy to be mounted to an exhaust gas pipe in an exhaust gas purifying system, and of being easy for the temperature to increase uniformly to a desired temperature.

To achieve the above purposes, the present exemplary embodiment provides a honeycomb structural body having a honeycomb body and a pair of electrodes. The honeycomb body has a cell formation part and an outer skin part of a cylindrical hollow shape. The outer skin part covers the cell formation part. The pair of the electrodes is formed on an outer peripheral surface (namely, outer circumferential surface) of the outer skin part so that the electrodes of the electrode pair face to each other in a diameter direction of the honeycomb body. That is, the electrodes face to each other through the honeycomb body. In the honeycomb structural body, each of the electrodes has a reference electrode part and one or more outside electrode parts. The reference electrode part is formed at a central part of the electrode in the circumferential direction of the honeycomb body. The outside electrode parts are formed at both ends of the reference electrode part. The electrode terminal is formed on the reference electrode part of each electrode. The reference electrode part of one electrode faces the reference electrode part of the other electrode to each other in a radial direction of the honeycomb body. The outside electrode parts of one electrode face the outside electrode parts of the other electrode in one to one correspondence along a radial direction of the honeycomb body. An electrical resistivity of the reference electrode part is smaller than an electrical resistivity of each of the outside electrode parts in each of the electrodes of the honeycomb structural body.

In the honeycomb body in the honeycomb structural body having the above improved structure, the cell formation part in the honeycomb body is covered with the outer skin part. A cross section of the honeycomb body, which is perpendicular to an axial direction of the honeycomb body, is a circular shape. Accordingly, the distance between the electrodes facing together in the radial direction of the honeycomb body is changed at the position on the electrode. Specifically, the more the position apart from the central part of each electrode is increased, the more the distance between the electrodes of the electrode pair is decreased. This means that the more the position on the electrode apart from the central part of the electrode is increased, the more a current easily flows between the electrodes through the inside of the honeycomb body.

In the structure of the honeycomb structural body, each of the electrodes formed on the outer circumferential surface of the honeycomb body is divided along the circumferential direction into a plurality of parts, namely, the reference electrode part and the outside electrode parts. That is, the reference electrode parts of the electrodes in the electrode pair make a pair. The outside electrode parts of the electrodes in the electrode pair also make a pair. The reference electrode part is formed at a central part of each electrode. The outside electrode parts are formed at both ends of the reference electrode part of each electrode. In other words, each electrode has the single reference electrode part and one pair or more pairs of the outside electrode parts formed at both the ends of the reference electrode part. In each electrode, the electrical resistivity of the reference electrode part is smaller than the electrical resistivity of each of the outside electrode part, where the distance between the reference electrode parts in the electrode pair is longer than the distance between the outside electrode parts in the electrode pair.

As described above, each electrode is divided along the circumferential direction of the honeycomb body, and the electrical resistivity of each divided part is adjusted according to the distance between the divided parts in the electrode pair. This structure makes it possible to suppress the deviation of the electrical resistance value between the divided parts in the electrode pair, and to have a uniform distribution of current flowing in the honeycomb body.

This structure of the electrode pair makes it possible for the temperature of the honeycomb body to increase uniformly even if the honeycomb body has a circular shaped cross section which is perpendicular to an axial direction of the honeycomb body. Further, this structure of the electrode pair makes it possible to suppress the deviation from a uniform temperature distribution in the inside of the honeycomb body. Further, this structure of the electrode pair makes it possible to suppress and relax the thermal stress generated in the inside of the honeycomb body, and to prevent cracks from being generated in the honeycomb body, and to prevent the honeycomb body from being damaged and broken.

Still further, the honeycomb body in the honeycomb structural body according to the exemplary embodiment has a circular shaped cross section which is perpendicular to an axial direction of the honeycomb body. That is, the honeycomb body has a cylindrical shape. This shape makes it possible to easily handle the honeycomb structural body. For example, this structure allows the honeycomb structural body having the honeycomb body to be mounted into an exhaust gas pipe of the exhaust gas purifying system for an internal combustion engine, for example, of a motor vehicle.

Furthermore, this structure of the honeycomb structural body according to the exemplary embodiment makes it possible to store the honeycomb structural body in the exhaust gas pipe with uniform stress applied from the outer periphery toward the inside of the honeycomb structural body. This makes it possible to suppress cracks from being generated in the honeycomb structural body by vibration and stress. It is therefore possible to easily mount the honeycomb structural body to the exhaust gas purifying system of the motor vehicle.

In accordance with other exemplary embodiment of the present invention, there is provided an electrically heated catalyst (EHC) device having the honeycomb structural body previously described, catalyst supported in the honeycomb body and an electric power supplying device. The electric power supplying device supplies electric power to the electrode pair in the honeycomb structural body in order to heat the honeycomb body.

The electrically heated catalyst (EHC) device is equipped with the honeycomb structural body previously described. When electric power is supplied to the electrode pair formed on the outer circumferential surface of the outer skin part of the honeycomb body, the temperature of the inside of the honeycomb body is increased uniformly. This makes it possible for the catalyst supported in the honeycomb body to activate uniformly with high efficiency, and to purify exhaust gas emitted from the internal combustion engine of the motor vehicle as soon as the electric power is supplied to the honeycomb body.

Accordingly, the exemplary embodiments of the present invention provide the honeycomb structural body and the electrically heated catalyst device. The honeycomb structural body is easy to mount to the exhaust gas purifying system, and the temperature of the honeycomb structural body is increased uniformly.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
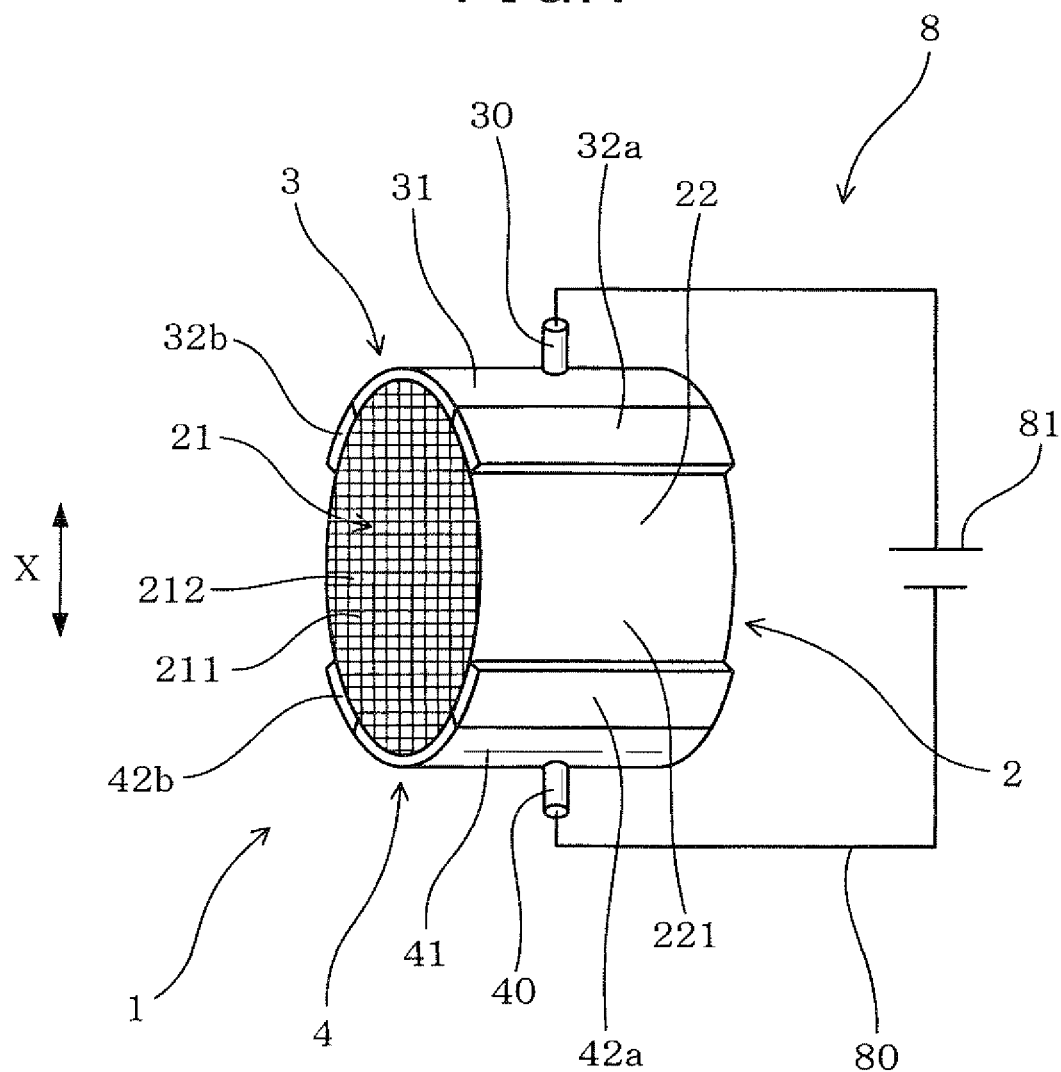
FIG. 1 is a view showing a perspective configuration of a honeycomb structural body according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.
First Exemplary Embodiment A description will be given of a honeycomb structural body and an electrically heated catalyst (EHC) device of an electrical heating type equipped with the honeycomb structural body according to a first exemplary embodiment of the present invention with reference to FIG. 1 to FIG. 3.

Figure 2:
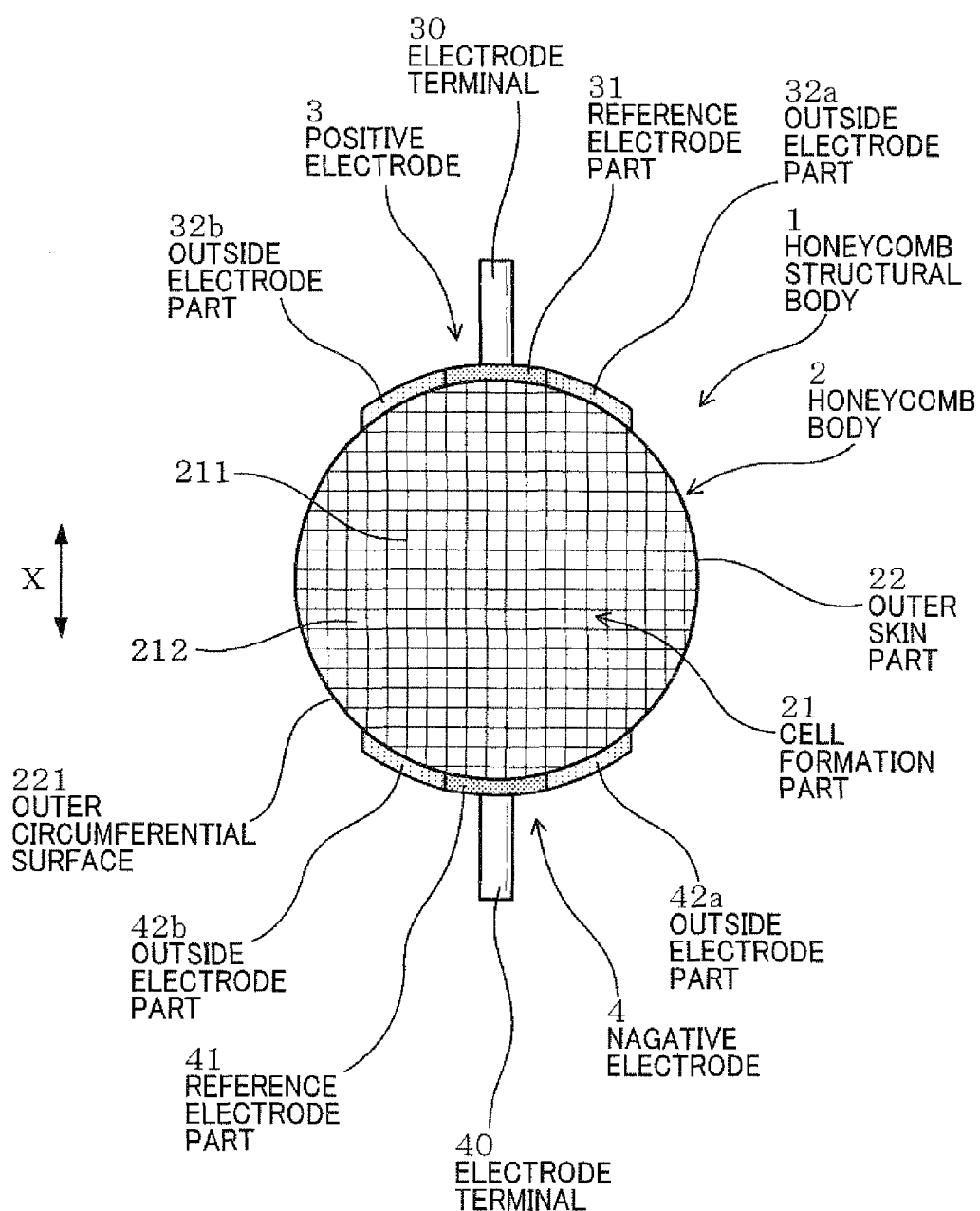
FIG. 2 is a view showing a cross section of a honeycomb structural body, which is perpendicular to an axial direction thereof, according to the first exemplary embodiment of the present invention.
Figure 3:
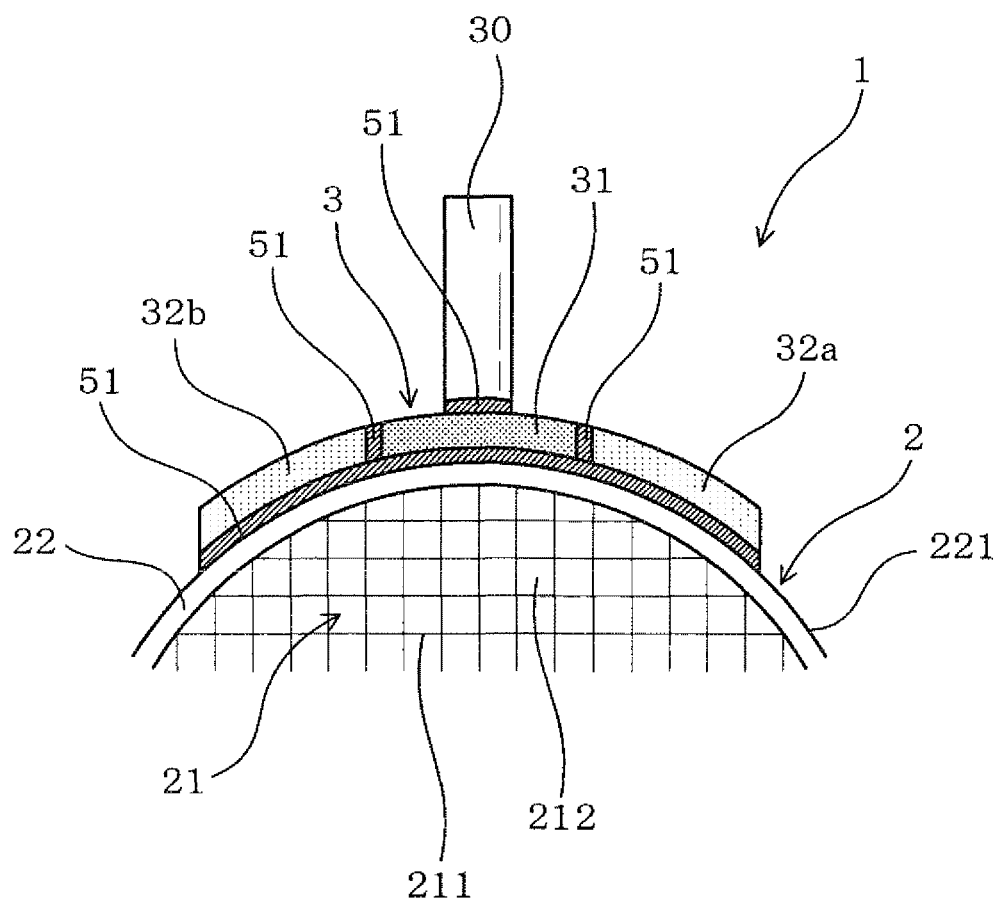
FIG. 3 is a view showing an enlarged cross section of a part around a positive electrode formed on a surface of the honeycomb structural body according to the first exemplary embodiment of the present invention.

FIG. 1 is a view showing a perspective configuration of the honeycomb structural body 1 according to the first exemplary embodiment of the present invention. FIG. 2 is a view showing a cross section of the honeycomb structural body 1. The cross section shown in FIG. 2 is perpendicular to an axial direction of the honeycomb structural body 1. FIG. 3 is a view showing an enlarged cross section of a part around a positive electrode 3 formed on a surface of the honeycomb structural body 1 shown in FIG. 1.

As shown in FIG. 1, FIG. 2 and FIG. 3, the honeycomb structural body 1 according to the first exemplary embodiment is comprised of a honeycomb body 2 and a pair of the positive electrode 3 and a negative electrode 4.

The honeycomb body 2 has a cell formation part 21 and an outer skin part 22 of a cylindrical shape. The cell formation part 21 is covered with the outer skin part 22. The positive electrode 3 and the negative electrode 4 are formed on the outer circumferential surface 221 of the outer skin part 22 in a radial direction of the honeycomb body 2. The positive electrode 3 and the negative electrode 4 are arranged opposite to each other in the radial direction of the honeycomb structural body 1.

The positive electrode 3 is comprised of a reference electrode part 31 and outside electrode parts 32a and 32b. The reference electrode part 31 is formed at a central part of the positive electrode 3 in the circumferential direction. The outside electrode parts 32a and 32b are formed at both sides of the reference electrode part 31 in the circumferential direction.

The negative electrode 4 is comprised of a reference electrode part 41 and outside electrode parts 42a and 42b. The reference electrode part 41 is formed at a central part of the positive electrode 4 in the circumferential direction. The outside electrode parts 42a and 42b are formed at both sides of the reference electrode part 41 in the circumferential direction.

The reference electrode parts 31 and 41 are opposite to each other and make a pair in the direction X shown in FIG. 1. Similarly, the outside electrode parts 32a and 32b and the outside electrode parts 42a and 42b are opposite to each other and make a pair in the direction X shown in FIG. 1.

In each of the electrodes 3 and 4, the reference electrode part 31 (41) is smaller in an electrical resistivity than each of the outside electrode parts 32a and 32b (42a, 42b).

A description will now be given of the electrical resistivity of each of the reference electrode part and the outside electrode parts of the positive electrode 3 and the negative electrode 4 formed on the outer skin part 22 of the honeycomb body 2 in the honeycomb structural body 1 in detail.

As shown in FIG. 1, the honeycomb structural body 1 is comprised of the cell formation part 21 and the outer skin part 22. The cell formation part 21 is covered with the outer skin part 22. The honeycomb structural body 1 has a cylindrical shape and is made of porous ceramics composed of silicon carbide SiC.

The cell formation part 21 is comprised of porous partition walls 211 and cells 212. The porous partition walls 211 are arranged in a lattice shape and make the cells 212 which extend to an axial direction or a longitudinal direction of the honeycomb body 2. Each cell is surrounded by the porous partition walls 211.

As shown in FIG. 1 and FIG. 2, the electrode pair 3 and 4 is formed in the radial direction on the outer circumferential surface 221 of the outer skin part 22 of the honeycomb body 2 so that the positive electrode 3 and the negative electrode 4 sandwich the honeycomb body 2.

Each of the positive electrode 3 and the negative electrode 4 has the same thickness and are extended along the outer circumferential surface 221 of the outer skin part 22 in the circumferential direction. Each of the positive electrode 3 and the negative electrode 4 is made of conductive ceramics composed of SiC—Si composite. In the first exemplary embodiment, each of the positive electrode 3 and the negative electrode 4 has the thickness of 0.1 mm.

As shown in FIG. 2, the positive electrode 3 is comprised of the reference electrode part 31 and the outside electrode parts 32a and 32b. The reference electrode part 31 is formed at the central part of the positive electrode 3 in a circumferential direction. The outside electrode parts 32a and 32b are formed at both sides of the reference electrode part 31 in a circumferential direction. That is, the positive electrode 3 is comprised of the single reference electrode part 31 and the two outside electrode parts 32a and 32b formed at both sides of the reference electrode part 31. A positive electrode terminal 30 is formed on the reference electrode part 31. The positive electrode terminal 30 is formed at the central part of the reference electrode part 31 in a circumferential direction and the radial direction.

On the other hand, as shown in FIG. 2, the negative electrode 4 is comprised of the reference electrode part 41 and the outside electrode parts 42a and 42b. The reference electrode part 41 is formed at the central part of the negative electrode 4 in a circumferential direction. The outside electrode parts 42a and 42b are formed at both sides of the reference electrode part 41 in a circumferential direction. That is, the negative electrode 4 is comprised of the single reference electrode part 41 and the two outside electrode parts 42a and 42b formed at both sides of the reference electrode part 41. A negative electrode terminal 40 is formed in the reference electrode part 41. The negative electrode terminal 40 is formed at the central part of the reference electrode part 41 in a circumferential direction and a radial direction.

As clearly shown in FIG. 2, the reference electrode part 31 of the positive electrode 3 and the reference electrode part 41 of the negative electrode 4 are formed opposite to each other in the facing direction X in a radial direction of the honeycomb body 2. The reference electrode part 31 and the reference electrode part 41 are symmetric with respect to the facing direction X.

Still further, the outside electrode parts 32a and 32b of the positive electrode 3 and the outside electrode parts 42a and 42b of the negative electrode 4 are symmetric with respect to the facing direction X of the positive electrode 3 and the negative electrode 4 as the electrode pair. That is, the outside electrode parts 32a and 32b and the outside electrode parts 42a and 42b make a pair of the outside electrode parts 32a and 42a and a pair of the outside electrode parts 32b and 42b in the facing direction X.

As shown in FIG. 3, in the positive electrode 3, the reference electrode part 31 and the outside electrode parts 32a and 32b are adjacent to each other. That is, one end of the reference electrode part 31 is adjacent to the outside electrode part 32a and the other end of the reference electrode part 31 is adjacent to the outside electrode part 32b. The reference electrode part 31 and the outside electrode part 32a are connected together by conductive adhesive 51. The reference electrode part 31 and the outside electrode part 32b are connected together by the conductive adhesive 51. The conductive adhesive 51 is made of paste containing SiC—Si composite, carbon, binder, etc. As previously described, the positive electrode 3 is made of conductive ceramics composed of such SiC—Si composite.

In addition, the reference electrode part 31 and the outside electrode parts 32a and 32b are bonded and fixed to the outer circumferential surface 221 of the outer skin part 22 of the honeycomb body 2 through the conductive adhesive 51. That is, the conductive adhesive 51 is applied onto the outer circumferential surface 221 so that the conductive adhesive 51 is sandwiched between the outer circumferential surface 221 and the reference electrode part 31 and the outside electrode parts 32a and 32b.

Further, the electrode terminal 30 is bonded to the reference electrode part 31 through the conductive adhesive 51 sandwiched between the electrode terminal 30 and the reference electrode part 31.

On the other hand, as omitted from the drawings, the negative electrode 4 has the same structure of the positive electrode 3 shown in FIG. 3. That is, in the negative electrode 4, the reference electrode part 41 and the outside electrode parts 42a and 42b are adjacent to each other. That is, one end of the reference electrode part 41 is adjacent to the outside electrode part 42a and the other end of the reference electrode part 41 is adjacent to the outside electrode part 42b. The reference electrode part 41 and the outside electrode part 42a are connected together by conductive adhesive 51. The reference electrode part 41 and the outside electrode part 42b are connected together by the conductive adhesive 51. In addition, the reference electrode part 41 and the outside electrode parts 42a and 42b are bonded to the outer circumferential surface 221 of the outer skin part 22 of the honeycomb body 2 through the conductive adhesive 51. That is, the conductive adhesive 51 is applied onto the outer circumferential surface 221 so that the conductive adhesive 51 is sandwiched between the outer circumferential surface 221 and the reference electrode part 41 and the outside electrode parts 42a and 42b. Further, the electrode terminal 40 is bonded to the reference electrode part 41 through the conductive adhesive 51 sandwiched between the electrode terminal 40 and the reference electrode part 41.

As shown in FIG. 1 and FIG. 2, in the positive electrode 3, the reference electrode part 31 is smaller in electrical resistivity than each of the outside electrode parts 32a and 32b. The outside electrode parts 32a and 32b are adjacent to both the sides of the reference electrode part 31 in the circumferential direction of the outer skin part 22 formed on the honeycomb body 2.

Similarly, in the negative electrode 4, the reference electrode part 41 is smaller in electrical resistivity than the outside electrode parts 42a and 42b. The outside electrode parts 42a and 42b are adjacent at both sides of the reference electrode part 41 in the circumferential direction of the outer skin part 22 of the honeycomb body 2.

In both the positive electrode 3 and the negative electrode 4, the reference electrode part 31 and the reference electrode part 41 have the same electrical resistivity. Further, the outside electrode parts 32a and 32b and the outside electrode parts 42a and 42b have the same electrical resistivity.

Further, the honeycomb body 2 is larger in electrical resistivity than each of the reference electrode part 31, the reference electrode part 41, the outside electrode parts 32a and 32b and the outside electrode parts 42a and 42b in positive electrode 3 and the negative electrode 4.

As shown in FIG. 1, the electrode terminal 30 formed on the positive electrode 3 is connected to a positive electrode of an outside power source 81 through an electrical path 80, and the electrode terminal 40 formed on the negative electrode 4 is connected to a negative electrode of the outside power source 81 through the electrical path 80.

Catalyst is supported on the surface of the partition walls 211 of the cell formation part 21 in the honeycomb body 2. The first exemplary embodiment uses three-way catalyst such as noble metal, for example, platinum (Pt), palladium (Pd), rhodium (Rh), etc.

When the electric power source 81 supplies electric power to the positive electrode 3 and the negative electrode 4 which form the electrode pair through the electrical path 80, current flows in the inside of the honeycomb body 2, thermal energy is thereby generated in the inside of the honeycomb body 2. This heats the honeycomb body 2 to a desired temperature. Thus, the honeycomb structural body 1 according to the first exemplary embodiment can be used as an electrical heated catalyst (EHC) device 8.

Next, a description will now be given of the method of producing the honeycomb structural body 1 according to the first exemplary embodiment.

At first, porous ceramics composed of silicon carbide SiC, etc. is prepared, and the porous ceramics is molded to the honeycomb body 2 of a desired cylindrical shape. Electrode material sheets are molded in order to produce the positive electrode 3 and the negative electrode 4 which are comprised of the reference electrode part 31, the outside electrode parts 32a and 32b, the reference electrode part 41, the outside electrode parts 42a and 42b. The electrode material sheet is made of fired SiC—Si composite.

Next, these electrode material sheets are arranged on the outer circumferential surface 221 of the outer skin part 22 of the honeycomb body 2 through the conductive adhesive paste 51 containing SiC—Si composite, carbon, binder, etc.

The conductive adhesive 51 is applied between the electrode material pastes arranged on the outer circumferential surface 221 of the outer skin part 22 of the honeycomb body 2 in order to bond the electrode material sheets together.

Next, the honeycomb body 2 with the electrode material sheets is fired in argon (Ar) gas atmosphere of an ordinary (or atmospheric) pressure at a predetermined temperature (approximately 1600° C.). This makes it possible to produce the honeycomb structural body 1 in which the pair of the positive electrode 3 and the negative electrode 4 is formed on the outer circumferential surface 221 of the outer skin part 22 of the honeycomb body 2, and the positive electrode 3 and the negative electrode 4. As previously described, the positive electrode 3 and the negative electrode 4 are comprised of the reference electrode part 31, the outside electrode parts 32a and 32b, the reference electrode part 41 and the outside electrode parts 42a and 42b.

Next, a description will now be given of the actions and effects of the electrically heated catalyst (EHC) device 8 equipped with the honeycomb structural body 1 according to the first exemplary embodiment.

In the honeycomb body 2 of the honeycomb structural body 1, the cell formation part 21 is covered with the outer skin part 22 of a cylindrical shape. A cross section of the honeycomb body 2 in a direction perpendicular to an axial direction of the honeycomb body 2 has a circular shape. Therefore, a distance in the facing direction X (shown in FIG. 1) between a part of the positive electrode 3 and a part of the negative electrode 4 is changed according to a part of the positive electrode 3 and the negative electrode 4, where the positive electrode 3 and a position of the negative electrode 4 are formed on the outer circumferential surface of the outer skin part 22 of the honeycomb body 2 along the circumferential direction. Specifically, a distance between the outside part of the positive electrode 3 and the outside part of the negative electrode 4 is shorter than a distance between a central part of the positive electrode 3 and a central part of the negative electrode 4. In other words, the more a part of the electrode is apart from the central part of the electrode, the more the distance in the facing direction X between the positive electrode 3 and the negative electrode 4 is decreased. The more the part of the electrode is close to the central part of the electrode, the more the distance in the facing direction X between the positive electrode 3 and the negative electrode 4 is increased.

This means that the more the distance in the facing direction X between the positive electrode 3 and the negative electrode 4 is decreased, the more a current flows between the positive electrode 3 and the negative electrode 4. On the other hand, the more the distance in the facing direction X between the positive electrode 3 and the negative electrode 4 is increased, the more a magnitude of the current flowing between the positive electrode 3 and the negative electrode 4 is decreased. That is, the current is easy to flow in the outside part of the electrode when compared with in the central part of each electrode.

In the structure of the honeycomb body 2 of the honeycomb structural body 1 according to the first exemplary embodiment, each of the positive electrode 3 and the negative electrode 4 formed on the outer circumferential surface of the honeycomb body 2 is divided in circumferential direction so as to form a combination of the reference electrode part 31 (41) and the outside electrode parts 32a and 32b (42a and 42b), where the reference electrode part 31 (41) is formed at the central part of the electrode 3 (4) and the outside electrode parts 32a and 32b are formed at both the sides of the electrode 3 (4). Further, the electrical resistivity of the reference electrode part 31 (41) having a long distance in the facing direction X (shown in FIG. 1) is lower than the electrical resistivity of the outside electrode parts 32a and 32b (42a and 42b) having a short distance in the facing direction X.

As previously described, each of the positive electrode 3 and the negative electrode 4 is divided in the circumferential direction into the reference electrode part 31 (41) and the outside electrode parts 32a and 32b (42a and 42b) and the electrical resistivity of the reference electrode part 31 (41) and the outside electrode parts 32a and 32b (42a and 42b) is adjusted according to the distance between the positive electrode 3 and the negative electrode 4. This structure of the honeycomb body 2 of the honeycomb structural body 1 makes it possible to suppress the electrical resistivity between the electrode terminals 30 and 40 from being deviated or changed by the current flowing through the electrical path between the positive electrode 3 and the negative electrode 4 in the honeycomb body 2. That is, this structure makes it possible to flow uniform current in the inside of the honeycomb body 2. Because the structure of the honeycomb body 2 makes it possible to flow a uniform current through the inside of the honeycomb body 2, it is possible for the temperature of the honeycomb body 2 to increase uniformly, and to suppress the temperature distribution in the inside of the honeycomb body 2 from being fluctuated or changed even if the honeycomb body 2 has a circular shaped cross section.

Still further, this structure of the honeycomb body 2 makes it possible to suppress and relax the thermal stress generated in the honeycomb body 2 when electric power is supplied to the positive electrode 3 and the negative electrode 4 and the temperature of the inside of the honeycomb body 2 is increased. It is therefore possible to prevent cracks from being generated in the honeycomb structural body, and to suppress the honeycomb body 2 from being damaged and broken.

The honeycomb body 2 has a cross section of a circular shape which is perpendicular to an axial direction of the honeycomb body 2. Further, the honeycomb body 2 has a cylindrical shape. This structure provides the honeycomb structural body 1 to be easy to handle. That is, this structure makes it possible to be easy to mount the honeycomb structural body 1 into the exhaust gas pipe of an exhaust gas purifying system of a motor vehicle. Further, this structure of the honeycomb body 2 makes it possible to store the honeycomb structural body 1 in the inside of the exhaust gas pipe while uniform pressure is supplied from the outer peripheral part to the honeycomb structural body 1. It is thereby possible to suppress the honeycomb structural body 1 from being damaged and broken by vibration and thermal stress and to maintain the honeycomb structural body 1 in the exhaust gas pipe for a long lifetime.

Still further, the electrical resistivity of the honeycomb body 2 is larger than that of each of the reference electrode parts 31, 41 and the outside electrode parts 32a, 32b, 42a and 42b. This makes it possible to ensure for a current to flow uniformly in the entire of the honeycomb body 2 through the electrode pair composed of the positive electrode 3 and the negative electrode 4. It is thereby possible for the entire of the honeycomb body 2 to be heated uniformly, and for the temperature of the entire of the honeycomb body 2 to increase uniformly.

Still further, each of the positive electrode 3 and the negative electrode 4 has a thickness within a range of 0.1 to 5 mm, where the positive electrode 3 is composed of the reference electrode part 31 and the outside electrode parts 32a and 32b, and the negative electrode 4 is comprised of the reference electrode part 41 and the outside electrode parts 42a and 42b. This structure makes it possible to easily and correctly form the positive electrode 3 and the negative electrode 4 on the outer circumferential surface 221 of the outer skin part 22 of the honeycomb body 2. Further, this structure makes it possible to ensure the honeycomb structural body 1 equipped with the honeycomb body 2 to be mounted to the exhaust gas pipe of the exhaust gas purifying system of a motor vehicle.

The electrically heated catalyst (EHC) device 8 according to the first exemplary embodiment is equipped with the honeycomb structural body 1 having the structure previously described. This makes it possible for the entire of the honeycomb body 2 of the honeycomb structural body 1 to be heated uniformly, and for the temperature of the entire of the honeycomb body 2 to increase uniformly as soon as the electric power source 81 supplies electric power to the positive electrode 3 and the negative electrode 4. It is possible to activate the catalyst supported in the honeycomb body 2 with high efficiency, and thereby possible to execute the exhaust gas purifying process as soon as the electric power is supplied to the positive electrode 3 and the negative electrode 4 formed in the honeycomb body 2.

As previously described in detail, the first exemplary embodiment provides the honeycomb structural body 1 having the honeycomb body 2 and the electrically heated catalyst (EHC) device 8 capable of uniformly increasing the entire of the honeycomb body 2 and being easy to be mounted to the exhaust gas purifying system of a motor vehicle.

Second Exemplary Embodiment

A description will be given of the honeycomb structural body 1-1 equipped with the electrodes of another structure according to the secondary exemplary embodiment with reference to FIG. 4.

Figure 4:
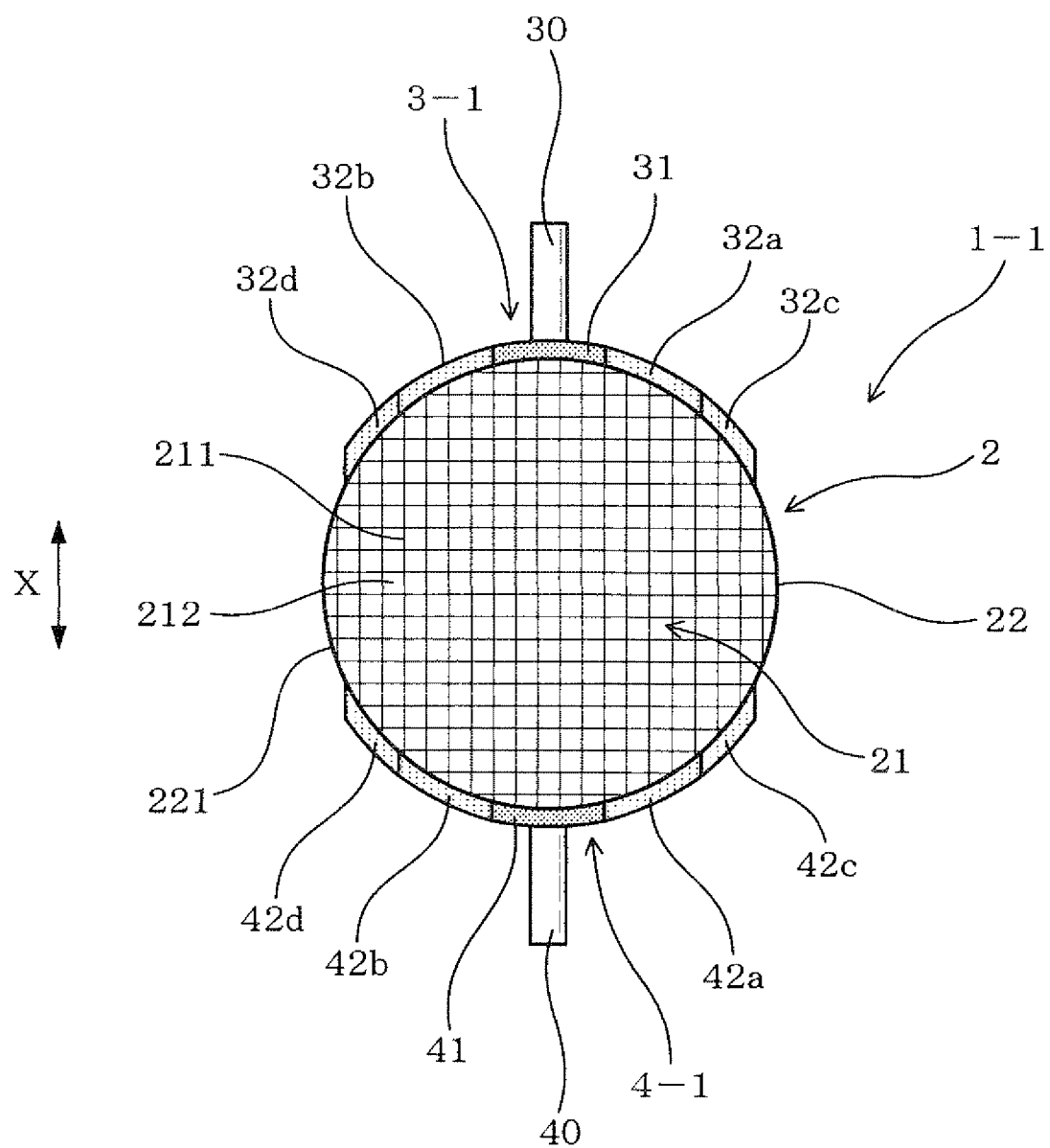
FIG. 4 is a view showing a cross section of a honeycomb structural body, which is perpendicular to an axial direction thereof, according to a second exemplary embodiment of the present invention.

FIG. 4 is a view showing a cross section of the honeycomb structural body 1-1, which is perpendicular to an axial direction thereof, according to the second exemplary embodiment of the present invention.

As shown in FIG. 4, in the honeycomb structural body 1-1, the positive electrode 3-1 is comprised of the reference electrode part 31, the outside electrode parts 32*a* and 32*b*, and most outside electrode parts 32*c* and 32*d*. The negative electrode 4-1 is comprised of the reference electrode part 41, the outside electrode parts 42*a* and 42*b*, and most outside electrode parts 42*c* and 42*d*. Further, the positive electrode 3-1 and the negative electrode 4-1 are formed so that the more the distance of each of the outside electrode parts 32*a*, 32*b*, 42*a* and 42*b* and the most outside electrode parts 32*c*, 32*d*, 42*c* and 42*d* detected from the reference electrode part 31 (41) is increased, the more the electrical resistivity is increased. That is, the most outside electrode part 32*c* (32*d*, 42*c* and 42*d*) has a large electrical resistivity than each of the outside electrode parts 32*a* (32*b*, 42*a* and 42*b*) and the reference electrode part 31 (41).

Specifically, as shown in FIG. 4, the positive electrode 3-1 is comprised of the reference electrode part 31 formed at the central part of the positive electrode 3-1, the outside electrode parts 32*a* and 32*b* formed at both sides of the reference electrode part 31, and the most outside electrode parts 32*c* and 32*d* formed at both sides of the outside electrode parts 32*a* and 32*b*. In other words, the positive electrode 3-1 is comprised of the single reference electrode part 31, the pair of the outside electrode parts 32*a* and 32*b*, and the pair of the two most outside electrode parts 32*c* and 32*d*.

On the other hand, similar to the structure of the positive electrode part 3 shown in FIG. 4, the negative electrode 4-1 is comprised of the reference electrode part 41 formed at the central part of the negative electrode 4-1, the outside electrode parts 42*a* and 42*b* formed at both sides of the reference electrode part 41, and the most outside electrode parts 42*c* and 42*d* formed at both sides of the outside electrode parts 42*a* and 42*b*. In other words, the negative electrode 4-1 is comprised of the single reference electrode part 41, the pair of the outside electrode parts 42*a* and 42*b*, and the pair of the two most outside electrode parts 42*c* and 42*d*.

The reference electrode part 31 of the positive electrode 3-1 and the reference electrode part 41 of the negative electrode 4-1 make a pair when observed in the facing direction X in which the reference electrode parts 31 and 41 are faced to each other in a radial direction. Further, the outside electrode parts 32*a* and 32*b* of the positive electrode 3-1 and the outside electrode parts 42*a* and 42*b* of the negative electrode 4-1 make a pair when observed in the facing direction X in which the outside electrode parts 32*a* and 32*b* and the outside electrode parts 42*a* and 42 are faced to each other in a radial direction.

In the positive electrode 3-1 shown in FIG. 4, the electrical resistivity of the outside electrode part 32*a* is smaller than that of the most outside electrode part 32*c*. Further, the electrical resistivity of the outside electrode part 32*b* is smaller than that of the most outside electrode part 32*d*.

That is, the electrical resistivity of the positive electrode 3-1 is increased along the circumferential direction from the central part toward the outside part thereof. Specifically, the electrical resistivity of the positive electrode 3-1 is increased from the reference electrode part 31 to the most outside electrode part 32*c*, and also increased from the reference electrode part 31 to the most outside electrode part 32*d*. That is, the most outside electrode parts 32*c* and 32*d* have the maximum electrical resistivity. The reference electrode part 31 has the minimum electrical resistivity. The outside electrode parts 32*a* and 32*b* have the intermediate electrical resistivity.

On the other hand, in the negative electrode 4-1 shown in FIG. 4, the electrical resistivity of the outside electrode part 42*a* is smaller than that of the most outside electrode part 42*c*. Further, the electrical resistivity of the outside electrode part 42*b* is smaller than that of the most outside electrode part 42*d*.

That is, the electrical resistivity of the negative electrode 4-1 is increased along the circumferential direction from the central part toward the outside part thereof. Specifically, the electrical resistivity of the negative electrode 4-1 is increased from the reference electrode part 41 to the most outside electrode part 42*c*, and also increased from the reference electrode part 41 to the most outside electrode part 42*d*. That is, the most outside electrode parts 42*c* and 42*d* have the maximum electrical resistivity. The reference electrode part 41 has the minimum electrical resistivity. The outside electrode parts 42*a* and 42*b* have the intermediate electrical resistivity.

In particular, the reference electrode part 31 of the positive electrode 34 and the reference electrode part 41 of the negative electrode 4-1 have the same electrical resistivity. Further, the outside electrode parts 32*a*, 42*a*, 32*b* and 42*b* have the same electrical resistivity. Still further, the most outside electrode parts 32*c*, 42*c*, 32*d* and 42*d* have the same electrical resistivity The electrical resistivity of the honeycomb body 2 is larger than the electrical resistivity of each of the reference electrode parts 31, 41, the outside electrode parts 32*a*, 32*b*, 42*a* and 42*b*.

Other components of the honeycomb structural body 1-1 according to the second exemplary embodiment are the same of those of the honeycomb structural body 1 according to the first exemplary embodiment.

In the structure of the honeycomb structural body 14 according to the second exemplary embodiment, the distance between the positive electrode 3-1 and the negative electrode 4-1 is detected along the facing direction X in which the positive electrode 3-1 and the negative electrode 4-1 face to each other through the inside of the honeycomb body 2.

In the honeycomb structural body 1-1 according to the second exemplary embodiment, the distance between the positive electrode 3-1 and the negative electrode 4-1 is decreased from the central part to the outside part along the circumferential direction of the outer skin part 22, and on the other hand the electrical resistivity of the electrode parts 32a-32d, 42a-42d is increased. This structure makes it possible to suppress deviation from a uniform distribution of current flowing in the inside of the honeycomb body 2 between the positive electrode 3-1 and the negative electrode 4-1. That is, this structure makes it possible for current to flow uniformly in the entire of the honeycomb body 2, and for the temperature of the inside of the honeycomb body 2 to increase uniformly as soon as electric power is supplied between the positive electrode 3-1 and the negative electrode 4-1.

Other actions and effects of the honeycomb structural body 1-1 according to the second exemplary embodiment are the same of these of the honeycomb structural body 1 according to the first exemplary embodiment.

As shown in FIG. 4, in the positive electrode 3-1 and the negative electrode 4-1 in the honeycomb structural body 1-1 according to the second exemplary embodiment, the outside electrode part 32a is formed at one end of the reference electrode part 31, and the outside electrode part 32b is formed at the other end of the reference electrode part 31. Similarly, the outside electrode part 42a is formed at one end of the reference electrode part 41, and the outside electrode part 42b is formed at the other end of the reference electrode part 41.

The concept of the present invention is not limited by this structure. For example, it is possible for each of the positive electrode 3-1 and the negative electrode 4-1 to have a structure in which three or more outside electrode parts are formed at one end part and the other end part of each of the reference electrode part, respectively, along the circumferential direction of the honeycomb body 2.

Third Exemplary Embodiment

A description will be given of the honeycomb structural body 1-2 equipped with the electrodes of another structure according to the third exemplary embodiment with reference to FIG. 5 and FIG. 6.

Figure 5:
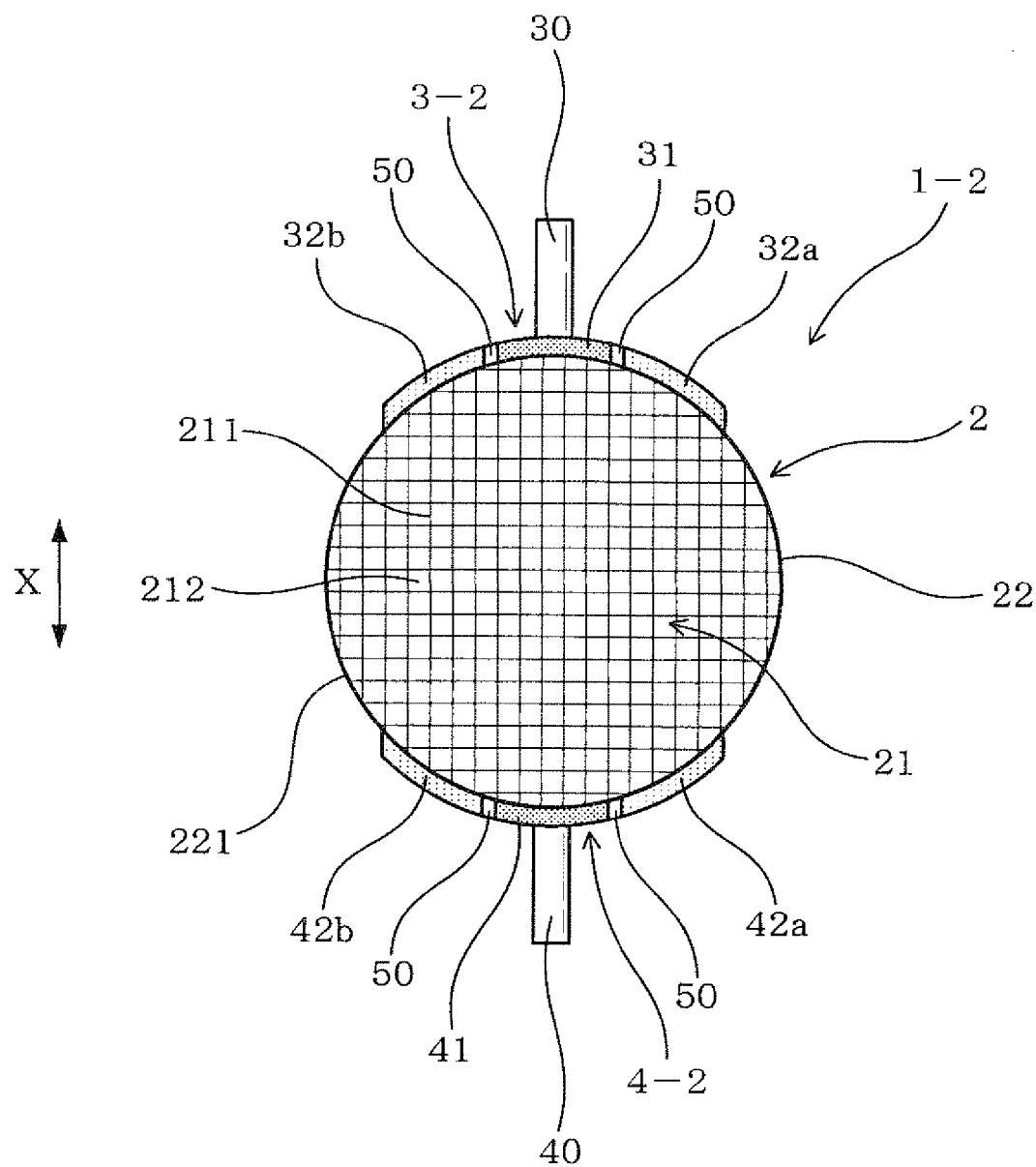
FIG. 5 is a view showing a cross section of a honeycomb structural body, which is perpendicular to an axial direction thereof, according to a third exemplary embodiment of the present invention.

FIG. 5 is a view showing a cross section of the honeycomb structural body 1-2, which is perpendicular to an axial direction thereof, according to the third exemplary embodiment of the present invention. FIG. 6 is a view showing the honeycomb structural body 1-2 according to the third exemplary embodiment, observed from a positive electrode 3-2 formed on the outer circumferential surface 221 of honeycomb body 2 in the honeycomb structural body 1-2.

Figure 6:
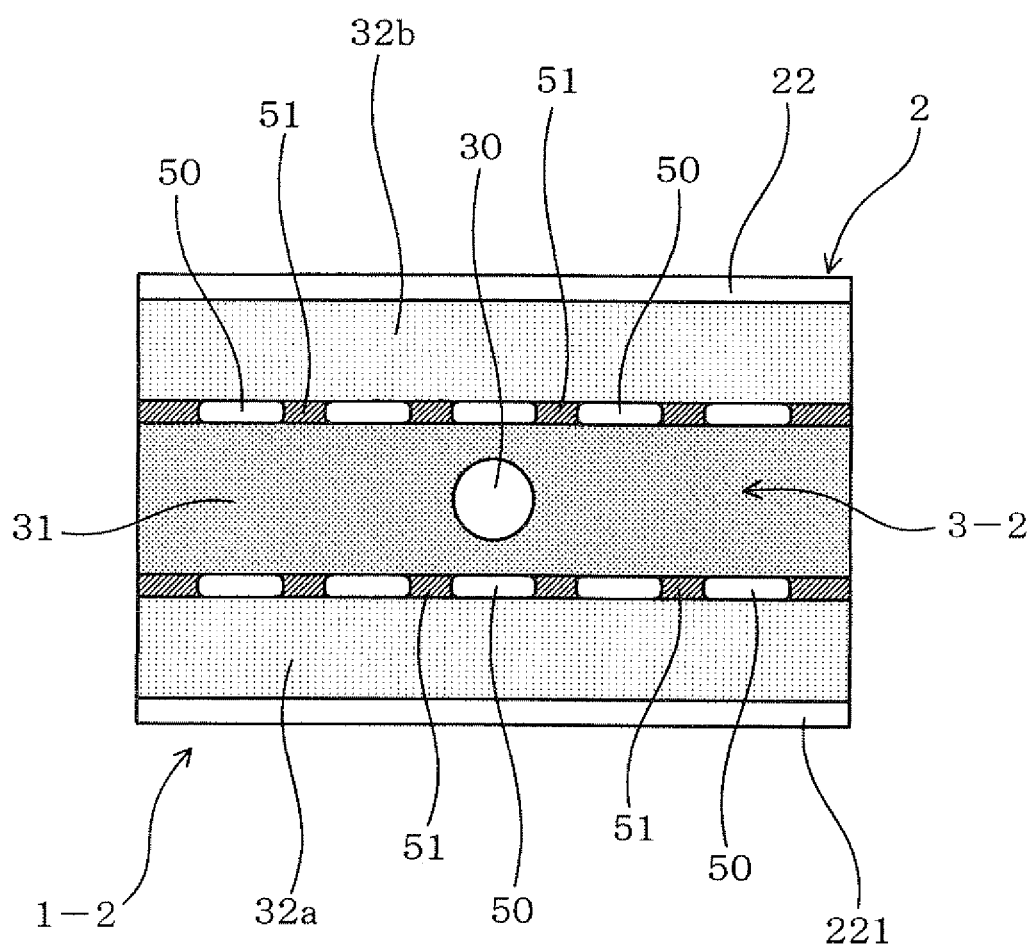
FIG. 6 is a view showing the honeycomb structural body according to the third exemplary embodiment, observed from a positive electrode formed on a surface of the honeycomb structural body.

As shown in FIG. 5 and FIG. 6, the honeycomb structural body 1-2 has the positive electrode 3-2 and the negative electrode 4-2 which are different in structure from the positive electrode 3 and the negative electrode 4 of the honeycomb structural body 1.

That is, as shown in FIG. 5, the positive electrode 3-2 is comprised of the reference electrode part 31, the outside electrode parts 32a and 32b, and gaps 50. The gaps 50 are formed between the reference electrode part 31 and the outside electrode part 32a. Further, the gaps 50 are also formed between the reference electrode part 31 and the outside electrode part 32b.

Similar to the structure of the positive electrode 3-2, the negative electrode 4-2 is comprised of the reference electrode part 41, the outside electrode parts 42a and 42b, and gaps 50. The gaps 50 are formed between the reference electrode part 41 and the outside electrode part 42a. Further, the gaps 50 are also formed between the reference electrode part 41 and the outside electrode part 42b.

Specifically, as shown in FIG. 6, the reference electrode part 31 and the outside electrode part 32a which are adjacent to each other are bonded by the conductive adhesive 51 formed between them. In particular, the gaps 50 are formed between the reference electrode part 31 and the outside electrode part 32a. The gaps 50 do not contain any conductive adhesive 51.

Similarly, the reference electrode part 31 and the outside electrode part 32b which are adjacent to each other are bonded by the conductive adhesive 51 formed between them. In particular, the gaps 50 are formed without adhesive 51 formed between the reference electrode part 31 and the outside electrode part 32b. That is, the gaps 50 do not contain any conductive adhesive 51.

On the other hand, as omitted from FIG. 6, the negative electrode 4 has the same structure of the positive electrode 3. That is, the reference electrode part 41 and the outside electrode part 42a which are adjacent to each other are bonded by the conductive adhesive 51 formed between them. In particular, the gaps 50 are formed between the reference electrode part 41 and the outside electrode part 42a. The gaps 50 do not contain any conductive adhesive 51. Similarly, the reference electrode part 41 and the outside electrode part 42b which are adjacent to each other are bonded by the conductive adhesive 51 formed between them. In particular, the gaps 50 are formed adhesive 51 formed between the reference electrode part 41 and the outside electrode part 42b. The gaps 50 do not contain any conductive adhesive 51.

Other components of the honeycomb structural body 1-2 according to the third exemplary embodiment are the same of those of the honeycomb structural body 1 according to the first exemplary embodiment.

The structure of the honeycomb structural body 1-2 according to the third exemplary embodiment makes it possible to suppress or relax the stress applied when the honeycomb structural body 1-2 is placed in the exhaust gas pipe of an exhaust gas purifying system of a motor vehicle and to suppress or relax vibration generated when the motor vehicle is driving. This makes it possible to prevent cracks from being generated in the honeycomb structural body 1-2 and to prevent the honeycomb structural body 1-2 from being damaged and broken.

Other actions and effects of the honeycomb structural body 1-2 according to the third exemplary embodiment are the same of these of the honeycomb structural body 1 according to the first exemplary embodiment.

It is also possible for the honeycomb structural body 1-2 according to the third exemplary embodiment to have the electrode structure shown in FIG. 4. That is, it is possible for the honeycomb structural body 1-2 to have the structure in which the outside electrode part 32a (42a) and the most outside electrode parts 32c (42c) are formed at one side of the reference electrode part 31 (41), and the outside electrode part 32b (42b) and the most outside electrode parts 32d (42d) are formed at the other side of the reference electrode part 31 (41). In this structure, the gaps 50 are formed between the outside electrode part 32a (42a) and the most outside electrode parts 32c (42c). This structure makes it possible to further prevent cracks from being generated in the honeycomb structural body.

Fourth Exemplary Embodiment

A description will be given of the honeycomb structural body 1-3 equipped with the electrodes of another structure according to the fourth exemplary embodiment with reference to FIG. 7, FIG. 8 and FIG. 9.

Figure 7:
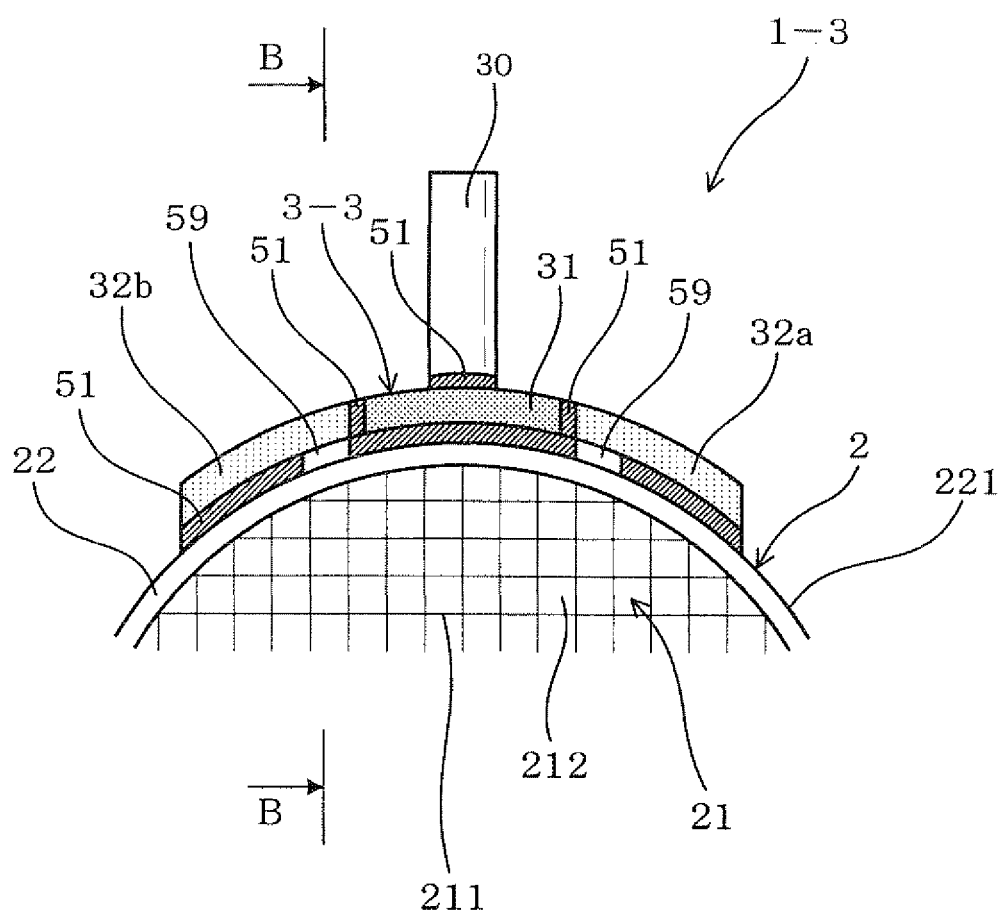
FIG. 7 is a view showing an enlarged cross section of a part around a positive electrode formed on a surface of a honeycomb structural body according to a fourth exemplary embodiment of the present invention.

FIG. 7 is a view showing an enlarged cross section of a part around a positive electrode formed on a surface of the honeycomb structural body 1-3 according to a fourth exemplary embodiment of the present invention. FIG. 8 is a view showing a cross section of the honeycomb structural body 1-3 along the line B-B shown in FIG. 7.

Figure 8:
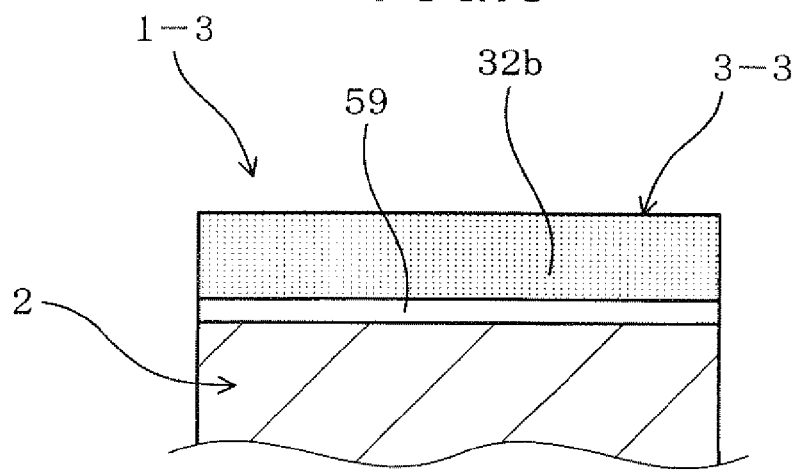
FIG. 8 is a view showing a cross section of the honeycomb structural body along the line B-B shown in FIG. 7.
Figure 9:
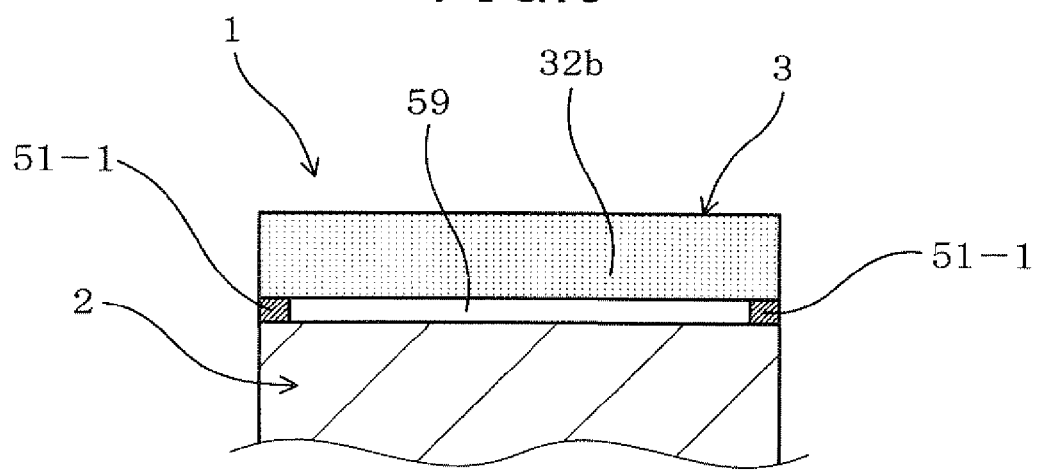
FIG. 9 is a view showing a cross section of another structure of the honeycomb structural body along the line B-B shown in FIG. 7.

As shown in FIG. 7 and FIG. 8, the honeycomb structural body 1-3 has the positive electrode 3-3 and the negative electrode 4-3 which are different in structure from the positive electrode 3 and the negative electrode 4 of the honeycomb structural body 1.

That is, as shown in FIG. 7 and FIG. 8, the positive electrode 3-3 is comprised of the reference electrode part 31, the outside electrode part 32a, the outside electrode part 32b and a gap 59. Further, the positive electrode 4-3 is comprised of the reference electrode part 41, the outside electrode part 42a, the outside electrode part 42b and a gap 59.

Specifically, as shown in FIG. 7 and FIG. 8, in the positive electrode 3-3, each of the outside electrode parts 32a and 32b is bonded onto the outer circumferential surface 221 of the outer skin part 22 of the honeycomb body 2 by conductive adhesive 51. In particular, as shown in FIG. 8, the gap 59 contains no conductive adhesive and is formed between each of the outside electrode parts 32a, 32b and the outer circumferential surface 221 of the outer skin part 22 of the honeycomb body 2.

Similar to the positive electrode 3-3, the negative electrode 4-3 has the same structure of the positive electrode 3-3. Therefore the explanation of the negative electrode 4-3 is omitted here. That is, in the negative electrode 4-3, each of the outside electrode parts 42a and 42b is bonded onto the outer circumferential surface 221 of the outer skin part 22 of the honeycomb body 2 by conductive adhesive 51. The gap 59 contains no conductive adhesive and is formed between each of the outside electrode parts 42a, 42b and the outer circumferential surface 221 of the outer skin part 22 of the honeycomb body 2.

As shown in FIG. 8, it is acceptable to form the gaps 59 along an axial direction of the honeycomb body 2. This structure introduces exhaust gas into the gap 59. This has a possibility of decreasing the capability of purifying exhaust gas, and of decreasing the bonding strength between the positive electrode 3-3 and the negative electrode 4-3 and the honeycomb body 2. In order to eliminate this, as shown in FIG. 9, it is possible to apply adhesive 51 on both end parts of the gap 59 along an axial direction. FIG. 9 is a view showing a cross section of another structure of the honeycomb structural body 3-3 along the line B-B shown in FIG. 7.

Other actions and effects of the honeycomb structural body 1-3 according to the fourth exemplary embodiment are the same of these of the honeycomb structural body 1 according to the first exemplary embodiment.

The presence of the gap 59 can adjust the electrical resistance value, namely, electrical resistivity at the outside parts (such as the outside electrode parts 32a, 32b, 42a and 42b) of the positive electrode 3-3 and the negative electrode 4-3. Specifically, it is possible to increase the electrical resistance value of the outside parts of each of the positive electrode 3-3 and the negative electrode 4-3 in order to prevent a current from flowing to the outside of the positive electrode 3-3 and the negative electrode 4-3. This structure makes it possible to suppress deviation from a uniform distribution of current flowing in the inside of the honeycomb body 2. That is, the structure of the honeycomb structural body 1-3 according to the fourth exemplary embodiment enhances the effect to decrease the deviation from a uniform distribution of current flowing in the honeycomb body 2.

Other actions and effects of the honeycomb structural body 1-3 according to the fourth exemplary embodiment are the same of these of the honeycomb structural body 1 according to the first exemplary embodiment.

Fifth Exemplary Embodiment

A description will be given of the honeycomb structural body 1-4 having a honeycomb body 2-1 according to a fifth exemplary embodiment with reference to FIG. 10 and FIG. 11

Figure 10:
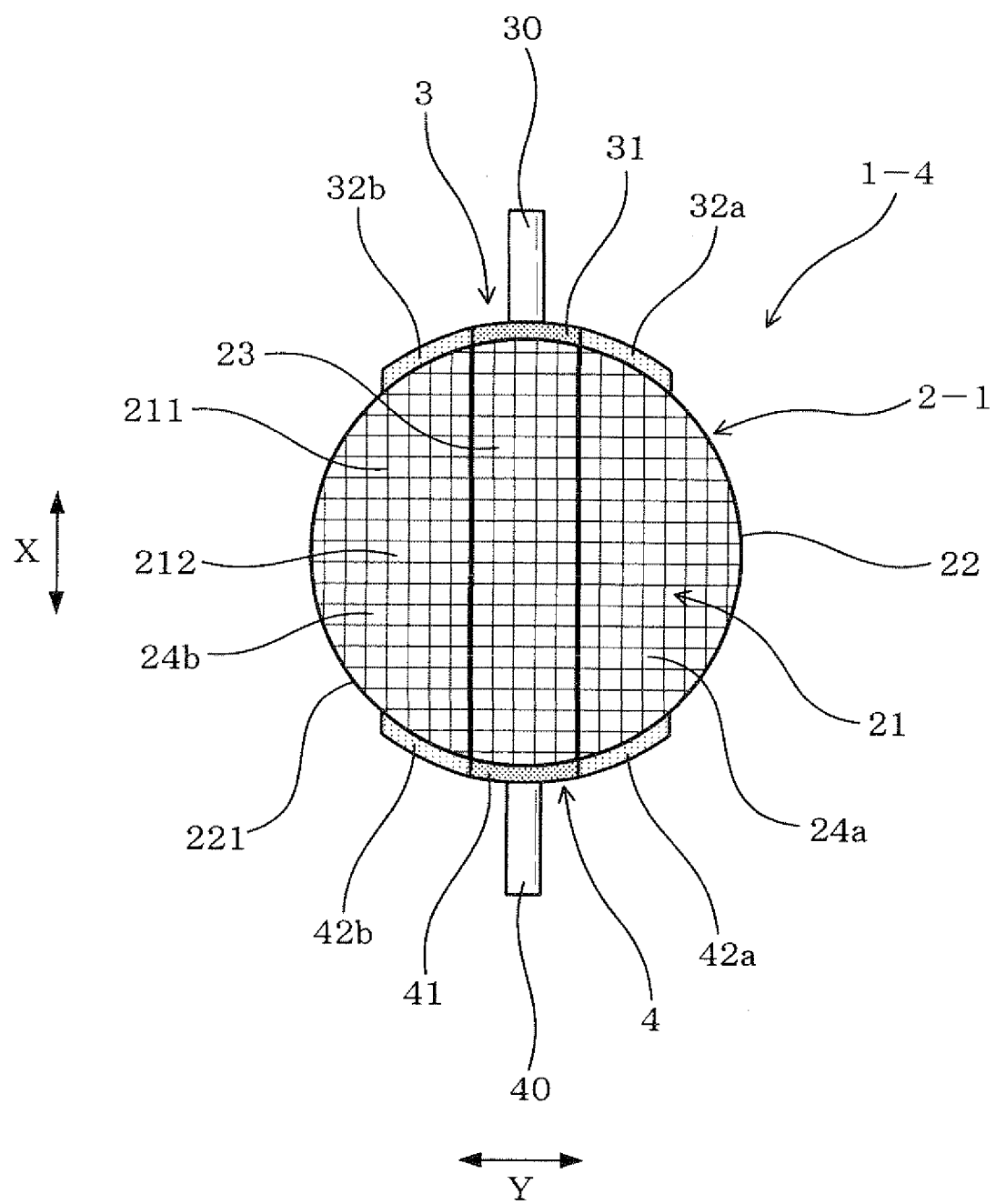
FIG. 10 is a view showing a cross section of a honeycomb structural body, which is perpendicular to an axial direction thereof, according to a fifth exemplary embodiment of the present invention.

FIG. 10 is a view showing a cross section of the honeycomb structural body 1-4, which is perpendicular to an axial direction thereof, according to the fifth exemplary embodiment of the present invention.

As shown in FIG. 10, the honeycomb body 2-1 is divided to a plurality of honeycomb parts composed of a reference honeycomb part 23 and outside honeycomb parts 24a and 24b The reference honeycomb part 23 and outside honeycomb parts 24a and 24b are obtained by two dividing directions as designated by two solid lines along the facing direction X. The two dividing directions are perpendicular to the horizontal direction Y shown in FIG. 10. That is, the reference honeycomb part 23 is formed at the central part of the honeycomb body 2-1, and the outside honeycomb parts 24a and 24b are placed at both sides of the reference honeycomb part 23. The outside honeycomb parts 24a and 24b are adjacent to the reference honeycomb part 23, respectively. Further, the electrical resistivity of the reference honeycomb part 23 is smaller than that of each of the outside honeycomb parts 24a and 24b. Still further, as shown in FIG. 10, the reference honeycomb part 23 is formed between the reference electrode parts 31 and 41 in the positive electrode 3 and the negative electrode 4. The positive electrode 3 and the negative electrode 4 form the electrode pair. The outside honeycomb part 24a is formed between the outside electrode parts 32a and 42a. The outside honeycomb part 24b is formed between the outside electrode parts 32b and 42b.

Specifically, as shown in FIG. 10, the honeycomb body 2-1 is comprised of the single reference honeycomb part 23 and the two outside honeycomb parts 24a and 24b. The outside honeycomb parts 24a and 24b are formed at both sides of the reference honeycomb part 23, respectively.

In particular, the reference honeycomb part 23 is formed between the reference electrode parts 31 and 41 in the positive electrode 3 and the negative electrode 4. The outside honeycomb part 24a is formed between the outside electrode parts 32a and 42a. The outside honeycomb part 24b is formed between the outside electrode parts 32b and 42b.

As previously described, the electrical resistivity of the reference honeycomb part 23 is smaller than that of each of the outside honeycomb parts 24a and 24b. Further, the outside honeycomb parts 24a and 24b have the same electrical resistivity.

Other components of the honeycomb structural body 1-4 according to the fifth exemplary embodiment are the same of those of the honeycomb structural body 1 according to the first exemplary embodiment.

As shown in FIG. 10, the structure of the honeycomb body 2-1 in the honeycomb structural body 1-4 according to the fifth exemplary embodiment makes it possible to adjust the electrical resistivity of the honeycomb body 2-1 formed between the pair of the positive electrode 3 and the negative electrode 4 in addition to adjust the electrical resistivity of each of the positive electrode 3 and the negative electrode 4. This structure further makes it possible for the temperature of the entire of the honeycomb body 2-1 to increase easily and uniformly. Still further, because the honeycomb body 2-1 is composed of the divided honeycomb parts, namely, composed of the reference honeycomb part 23 and the outside honeycomb parts 24a and 24b, it is possible to increase the structural strength of the entire of the honeycomb body 2-1.

Other components of the honeycomb structural body 1-4 equipped with the honeycomb body 2-1 according to the fifth exemplary embodiment are the same of those of the honeycomb structural body 1 according to the first exemplary embodiment.

As previously described in detail, the honeycomb body 2-1 is comprised of the reference honeycomb part 23 and the outside honeycomb parts 24a and 24b which are divided along the two facing directions X shown in FIG. 10. However, the concept of the present invention is not limited by this structure. It is possible for the honeycomb body 2-4 to have another structure.

Figure 11:
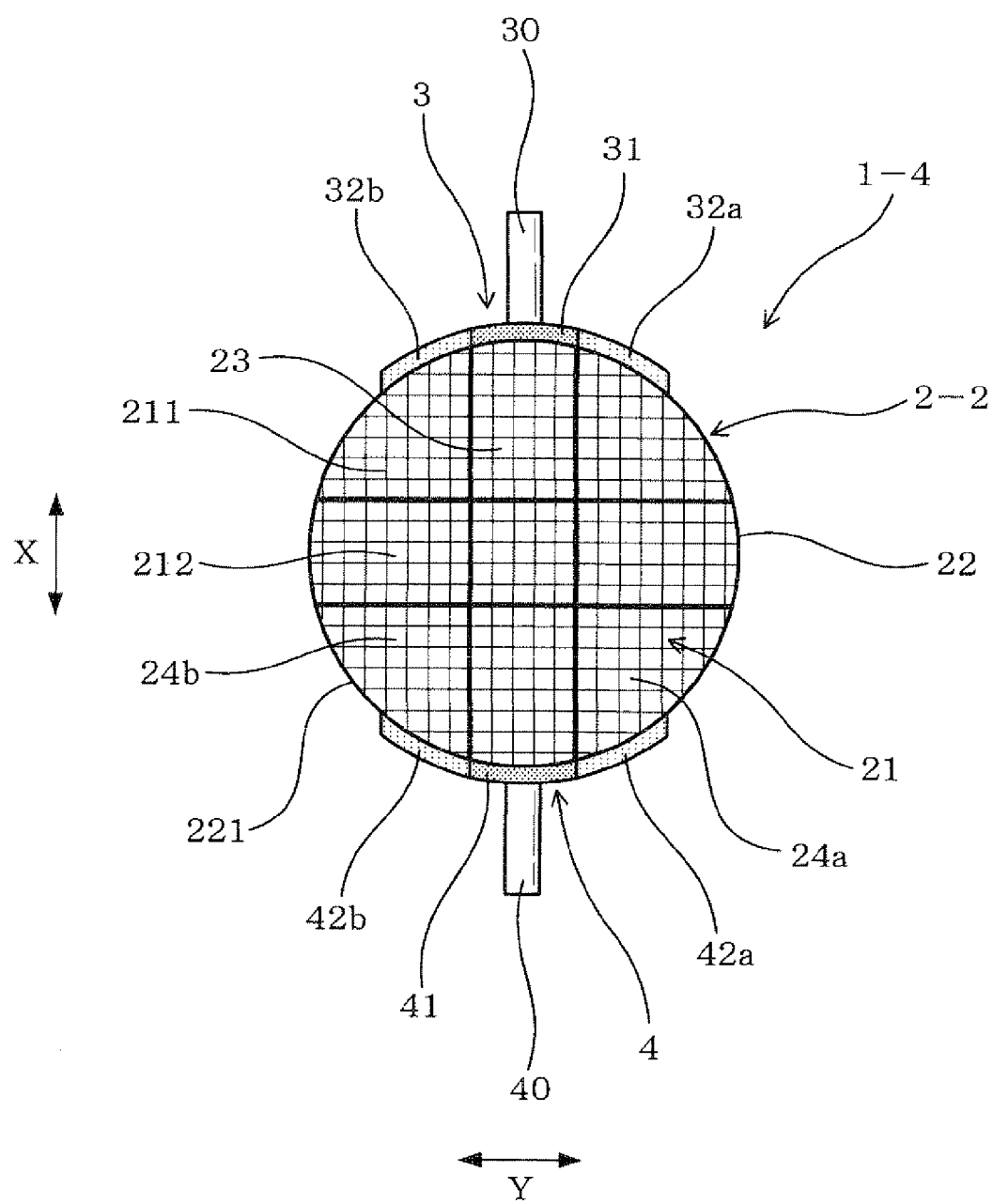
FIG. 11 is a view showing a cross section of another structure of the honeycomb structural body, which is perpendicular to the axial direction thereof, according to the fifth exemplary embodiment of the present invention.

FIG. 11 is a view showing a cross section of another structure of the honeycomb structural body 1-4, which is perpendicular to the axial direction thereof, according to the fifth exemplary embodiment of the present invention. As shown in FIG. 11, it is possible for the honeycomb body 2-1 to have a structure in which each of the reference honeycomb part 23 and the outside honeycomb parts 24a and 24 are divided into three honeycomb parts along the two horizontal directions in addition to the two facing directions X. This structure of the honeycomb body 2-2 shown in FIG. 11 makes it possible to further increase the entire strength of the honeycomb body 2-2 and to prevent the generation of cracks in the honeycomb body 2-2.

Sixth Exemplary Embodiment

A description will be given of the sixth exemplary embodiment according to the present invention.

The sixth exemplary embodiment detects the temperature rising capability of test samples as the honeycomb body in the honeycomb structural body.

The sixth exemplary embodiment prepared twelve test samples 1 to 12 of the honeycomb structural body. The sixth exemplary embodiment detected each of the test samples 1 to 12 when electric power was supplied to each of the test samples 1 to 12 in order to detect a temperature distribution in the test sample.

Figure 12:
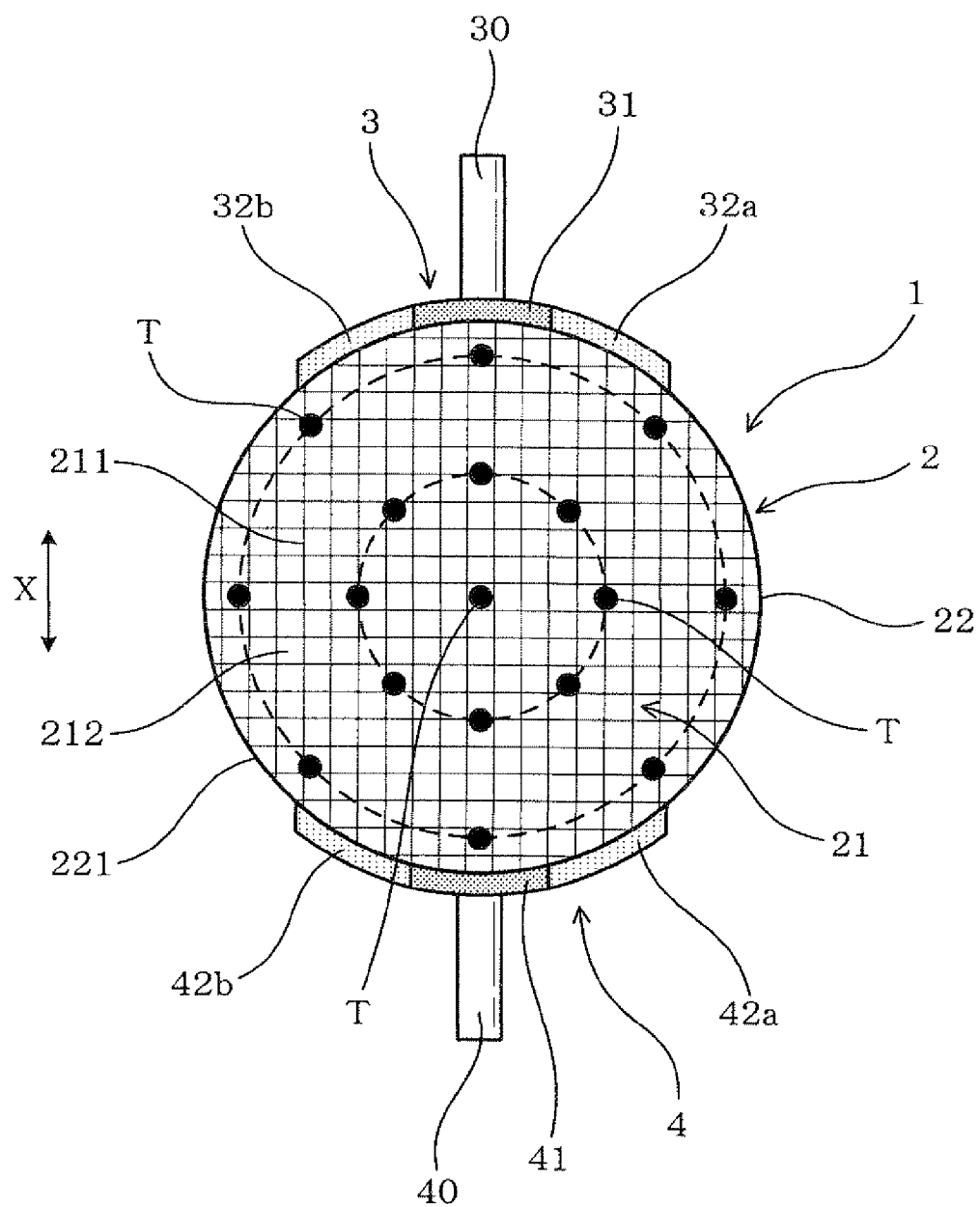
FIG. 12 is a view showing a cross section of the honeycomb body as a test sample according to a sixth exemplary embodiment of the present invention, on which temperature detection points are shown, and the cross section of the honeycomb body is perpendicular to the axial direction of the honeycomb structural body.

FIG. 12 is a view showing temperature detection points on a cross section of the honeycomb body which is perpendicular to the axial direction of the honeycomb body. At the detection points, a temperature of the honeycomb structural body as the test samples 1 to 12 was detected.

A description will now be given of the structure of each of the test samples 1 to 12.

The test sample 1 has a conventional structure of the honeycomb structural body in which a pair of electrodes such as a positive electrode and a negative electrode is formed on an outer peripheral surface of the honeycomb body.

On the other hand, the test samples 2 to 11 have the same structure of the honeycomb structural body according to the first and fourth exemplary embodiments (shown in FIG. 1 to FIG. 3 and FIG. 7 and FIG. 8). That is, in each of the test samples 2 to 11, the electrode pair having the positive electrode 3 and the negative electrode 4 is formed on the outer peripheral surface of the honeycomb body and each of the electrodes is comprised of the reference electrode part and the outside electrode parts, and the outside electrode parts are formed at both the ends of the reference electrode part.

Each of the test samples 1 to 12 has the honeycomb body made of conductive silicon carbide SiC. Each of the test samples 1 to 12 has an outer diameter of 93 mm and a length of 100 mm. In each of the test samples 1 to 12, the total number of cells is 400 cell per square inch (cpsi), and a thickness of each partition wall is 6 mil (mil=1/1000 inch). The electrical resistance value of the honeycomb body in each of the test samples 1 to 12 is 12Ω.

There are various methods of detecting the electrical resistance value of the honeycomb body in the honeycomb structural body. For example, one conventional method of detecting the electrical resistance value of the honeycomb body uses a multi-meter, etc. Such a multi-meter, known as a multitester or a volt-ohm meter (VOM), is an electronic measuring instrument that combines several measurement functions in one unit. A typical multi-meter may include features such as the ability to measure voltage, current and resistance. Electrodes are formed by using mesh shaped metal, plate shaped metal or Ag paste having a low electrical resistivity. When a constant current (for example 1 A) flows between the electrodes, such a multi-meter detects a voltage between the electrodes. The electrical resistance value is calculated on the basis of the detected voltage. It is possible to obtain a desired electrical resistance value of the honeycomb body by adjusting the size of the honeycomb body and a current to be supplied to the electrode formed on the outer peripheral surface of the honeycomb body.

Figure 13:
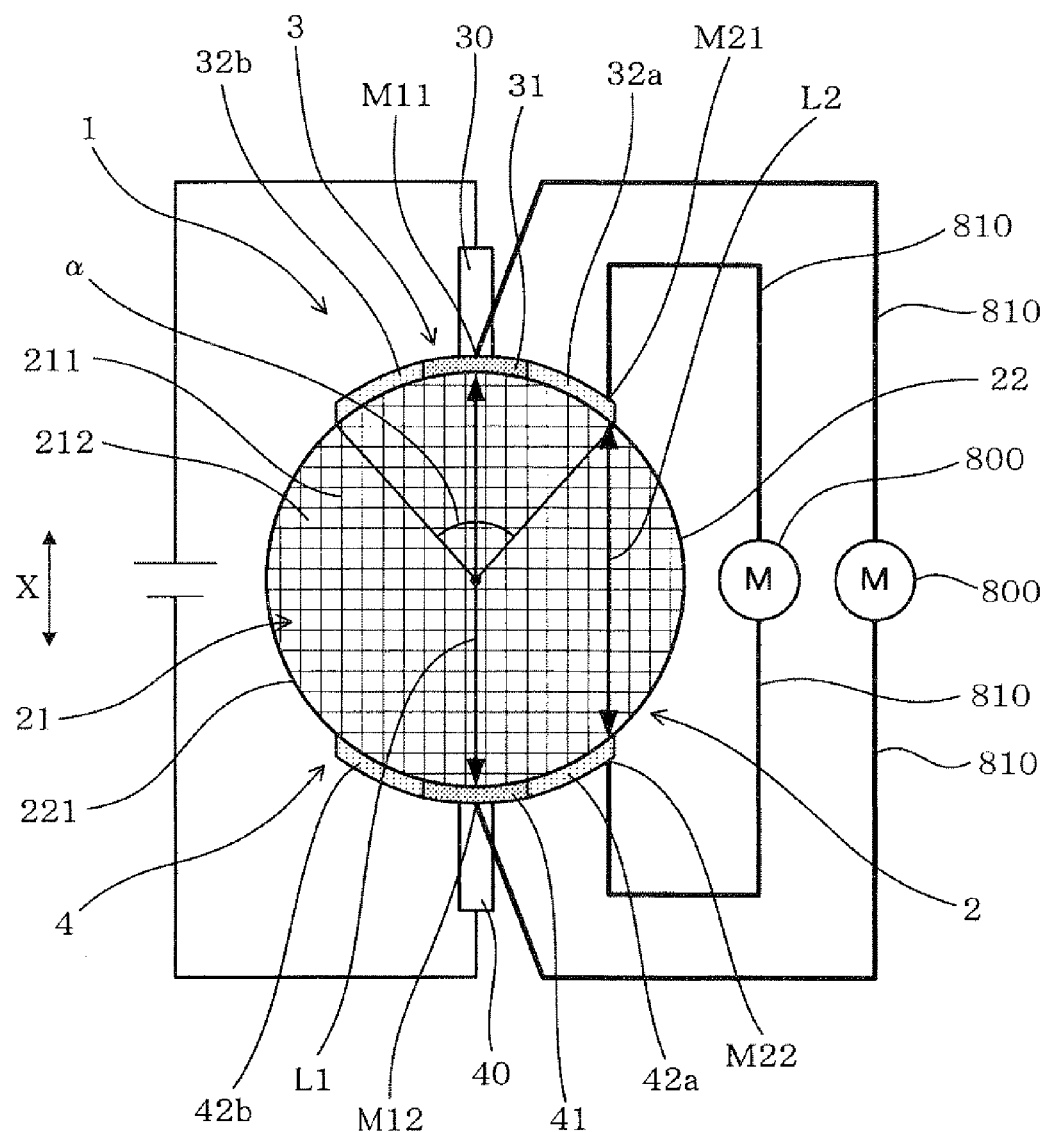
FIG. 13 is a view showing a method of detecting an electrical resistance value of the honeycomb structural body in the sixth exemplary embodiment of the present invention.

In the sixth exemplary embodiment, each of the test samples 1 to 12 has the same electrode angle α of 78° (see FIG. 13). FIG. 13 is a view showing a method of detecting the electrical resistance value of each of the test samples as the honeycomb structural body according to the sixth exemplary embodiment of the present invention.

This electrode angle α is an angle between the central point of the honeycomb body and both ends of each of the positive electrode and the negative electrode.

Each of the reference electrode part and the outside electrode parts in the positive electrode and the negative electrode has the same circumferential length of 21.1 mm measured along the circumferential direction of the honeycomb body.

In particular, it is preferable for the honeycomb body in the honeycomb structural body to have the electrode angle α of 78±10°.

When the honeycomb body has a large electrode angle α, that is, when the electrode angle α of the honeycomb body exceeds the range of 78±10°, (namely, exceeds 88°), a current more easily flows between the positive electrode and the negative electrode because the distance between the electrode pair is decreased.

On the other hand, when the honeycomb body has a small electrode angle α, that is, when the electrode angle α of the honeycomb body is less than the range of 78±10°, (namely, less than 68°), this makes a difficulty to flow a current between the positive electrode and the negative electrode because the distance between the electrode pair is decreased. This makes a current not flow in the outside part of the electrodes, and this thereby decreases the temperature of the honeycomb body.

As shown in FIG. 13, the longest distance L1 between of the electrode pair is the distance between the central part of the reference electrode part in the positive electrode and the central part of the reference electrode part in the negative electrode. Each of the test samples 1 to 12 has the longest distance L1 of 93 mm.

On the other hand, the shortest distance L2 between of the electrode pair is the distance between the most outside part in the outside electrode part in the positive electrode and the most outside part in the outside electrode part in the negative electrode. Each of the test samples 1 to 12 has the shortest distance L2 of 72.3 mm. In each of the test samples 1 to 12, (L1−L2)/L1 is the value of 0.22.

A description will now be given of the method of producing the honeycomb structural body (as the test samples 1 to 12).

First, the honeycomb body made of conductive silicon carbide SiC was produced.

Six types of electrode materials were prepared, which were used as the reference electrode part and the outside electrode parts in each of the positive electrode and the negative electrode in each of the test samples 1 to 12. Specifically, silicon carbide SiC powder and carbon C powder of a predetermined compositional ratio (see Table 1) were mixed. Binder, water and lubricating oil were added into the prepared mixture. The obtained clay mixture was extruded and molded to make a molded body as each test sample. The molded body has a cylindrical shape having an inner diameter of 93 mm, a thickness of 5 mm, and a length of 120 mm.

Next, the molded body was cut into a plurality of divided parts having a predetermined length. Metallurgical silicon (Si) powder, water and alcohol solvent, binder to adjust clay state were mixed to make slurry. The obtained slurry was applied on the surface of each of the divided molded bodies as the test samples. The sixth exemplary embodiment did not limit the quantity of slurry applied on the surface of each molded body when visible slurry was applied on the surface of each molded body. After this, the molded bodies were fired at 1700° C. over two hours under argon gas atmosphere. This made the molded bodies as the test samples with six types of electrode materials "a" to "e".

The electrical resistivity of each of the electrode materials "a" to "e" was detected. Table 1 shows the detection results.

The electrical resistivity of each of the electrode materials "a" to "e" was calculated by the following method.

The electrical resistance value of the electrode materials "a" to "e" was detected by the same method previously described. After this, the length and a cross sectional area of each of the electrode materials "a" to "e" was detected. Finally, the electrical resistivity "R" of each of the electrode materials "a" to "e" was detected by the following equation.

$R = \rho \times (L/A)$, where R is an electrical resistance value, $\rho$ is an electrical resistivity ($\Omega \cdot cm$), L is a length (cm), and A is a cross sectional area ($cm^2$).

TABLE 1

| Electrode material | Compositional ratio | | Electrical resistivity ($\Omega \cdot cm$) |
|---|---|---|---|
| | SiC (mass %) | C (mass %) | |
| a | 60 | 40 | 0.005 |
| b | 62 | 38 | 0.05 |
| c | 70 | 30 | 0.20 |
| d | 80 | 20 | 0.50 |
| e | 90 | 10 | 0.80 |
| f | 100 | 0 | 1.30 |

Adhesive paste was prepared, which was used to bond and fix the reference electrode part and the outside electrode parts onto the honeycomb body as the test samples.

Specifically, adhesive paste was made of the same material of the electrode materials "a" to "e" previously described. The adhesive paste was made by mixing silicon carbide SiC powder, carbon C powder having the same compositional ratio of the electrode materials "a" to "e", metallurgical silicon Si powder, binder to adjust the clay state and water.

The metallurgical silicon Si powder having (15×SiC (mass %)/85)+(C (mass %)×2.34) mass % was added to produce the adhesive paste when the mixture of silicon carbide SiC powder and carbon C powder had 100 mass %.

Binder to adjust clay state of 8 mass % was added when the mixture of silicon carbide SiC powder, carbon C powder and silicon Si powder had 100 mass %. Water of 45 mass % was added when the mixture of silicon carbide SiC powder, carbon C powder and silicon Si powder had 100 mass %. Further, methylcellulose was used as binder to adjust clay state.

For example, when the adhesive made of electrode material "a" was used, because the compositional ratio of silicon carbide SiC power and carbon C powder was 60 mass %:40 mass %, silicon carbide SiC powder of 60 g, carbon C powder of 40 g, metallurgical silicon Si powder of 104 g, binder to adjust clay state of 16 g, and water of 92 g.

After a pair of electrodes was formed on the outer peripheral surface of the honeycomb body as each test sample, the test samples were fired at 1600° C. over two hours in argon gas atmosphere.

Test sample 1 used electrode material "a". Test samples 2 to 12 used the electrode material "a" as reference electrode, and the electrode materials "b" to "f" as the outside electrode parts. Each of the electrode materials "b" to "f" had a large electrical resistivity rather than the electrode material "a". Table 2 shows a relationship between test samples 1 to 12 and the electrode materials "a" to "f".

Similar to the case of the fourth exemplary embodiment shown in FIG. 7 and FIG. 8, as previously described, each of test samples 7 to 12 had a gap formed between the outside electrode parts and the honeycomb body in order to detect the effects of the presence of the gap in test samples 1 and 3 because the test samples 2 and 3 had a large cross sectional area A (namely, the electrode materials b and c forming the outside electrode parts) in test samples 2 to 6.

Test samples 7 and 10 had the gap of a length of ¼ times of the outside electrode part in the circumferential direction.

Test samples 8 and 11 had the gap of a length of 2/4 times of the outside electrode part in the circumferential direction.

Test samples 9 and 12 had the gap of a length of ¾ times of the outside electrode part in the circumferential direction.

The volume of the gap in the above groups of the test samples 7 to 12, (the group of test samples 7 and 10, the group of test samples 8 and 11, and the group of test samples 9 and 12) had 0.3 $cm^3$, 0.5 $cm^3$ and 0.8 $cm^3$, respectively.

Each of test sample 1 to 12 as the honeycomb structural body had the electrode of a thickness of 1 mm, the adhesive of a thickness of 0.5 mm, and the electrode terminal of a diameter of 12 mm and a length of 15 mm. In each of test samples 1 to 12, the electrode terminal was made of the same material of the electrode material "a". The reference electrode part on which the electrode terminal was formed was made of the electrode material "a" having a low electrical resistivity when compared with that of other electrical materials "b" to "f" (see Table 1). This makes it possible to prevent a part between the electrode terminals from being partially heated.

TABLE 2

| Test sample No. | Electrode material | | Gap Presence | Volume ($cm^3$) |
|---|---|---|---|---|
| | Reference electrode part | Outside electrode part | | |
| 1 | a | a | none | — |
| 2 | a | b | none | — |
| 3 | a | c | none | — |
| 4 | a | d | none | — |
| 5 | a | e | none | — |
| 6 | a | f | none | — |
| 7 | a | b | presence | 0.3 |
| 8 | a | b | presence | 0.5 |
| 9 | a | b | presence | 0.8 |
| 10 | a | c | presence | 0.3 |
| 11 | a | c | presence | 0.5 |
| 12 | a | c | presence | 0.8 |

A description will now be given of the method of evaluating the test samples 1 to 12 as the honeycomb structural body having a different structure.

First, the method used a multi-meter to detect the electrical resistance value R1 at the longest distance L1 between the electrode pair, and the electrical resistance value R2 at the shortest distance L2 between the electrode pair while a current of 1 ampere (1 A) flows between the electrodes of each of the test samples 1 to 12 (see FIG. 13).

Following this, the method detected the value of (R1−R2)/R1. Further, the method calculated the value A which is represented by the equation of A=((L1−L2)/L1)/((R1−R2)/R1). In each of the test samples 1 to 12, the value of (L1−L2)/L1) was 0.22, previously described.

Next, electric power of 2 KW was supplied between the electrode pair such as the positive electrode and the negative electrode in each of the test samples 1 to 12 as the honeycomb structural body. After the elapse of 60 seconds, the method detected the temperature of each detection point T in each of the test samples 1 to 12. FIG. 12 shows seventeen detection points as designated by reference character "T". There are various detection methods of detecting the temperature of each of the detection points "T" such as thermocouples, thermography, Thermoviewer™, thermal imaging, and thermal video in order to detect radiation in the infrared range of the test samples 1 to 12. The method according to the sixth exemplary embodiment used Thermoviewer™.

The method detected a temperature difference ΔT between the highest temperature and the lowest temperature in the seventeen detection points T in each test sample in order to evaluate whether or not the entire of the test sample was heated uniformly. Table 3 shows the evaluation result.

TABLE 3

| Test sample. No. | Electrical resistance value | | (R1 − R2)/R1 | Value A | Temperature difference ΔT (° C.) |
|---|---|---|---|---|---|
| | R1 (Ω) | R2 (Ω) | | | |
| 1 | 12.0 | 11.8 | 0.017 | 13.2 | 220 |
| 2 | 12.4 | 12.1 | 0.024 | 9.1 | 173 |
| 3 | 11.5 | 10.7 | 0.073 | 3.0 | 104 |
| 4 | 11.8 | 9.7 | 0.179 | 1.2 | 95 |
| 5 | 11.7 | 8.3 | 0.289 | 0.8 | 91 |
| 6 | 12.2 | 6.7 | 0.450 | 0.5 | 108 |
| 7 | 12.1 | 11.8 | 0.026 | 8.4 | 163 |
| 8 | 12.0 | 11.6 | 0.032 | 7.0 | 139 |
| 9 | 11.9 | 11.5 | 0.037 | 5.9 | 133 |
| 10 | 11.7 | 9.1 | 0.225 | 1.0 | 77 |
| 11 | 12.2 | 9.0 | 0.259 | 0.8 | 88 |
| 12 | 12.4 | 8.7 | 0.298 | 0.7 | 102 |

As shown in Table 3, the test sample 1 had the value A of 13.2 and a temperature difference ΔT of 220° C.

On the other hand, test samples 2 to 12 had the value A within a range of 0.1 to 10 and the temperature difference ΔT of not more than 200° C. In each of the test samples 2 to 12, each electrode is comprised of the reference electrode part and the outside electrode parts having a different electrode resistivity. In particular, test samples 4, 5, 10 and 11 had an improved and superior structure having the value A within a range of 0.8 to 1.2, and the temperature difference ΔT of not more than 100° C.

The more the value A is decreased less than 1, the more the electrical resistance value of the outside of the outside electrode part is increased, and this makes it difficult to flow a current in the inside of the test sample. This increases the temperature difference ΔT.

As can be shown in Table 3, because each of test samples 7 to 9 had the gap between the outside electrode part and the surface of the honeycomb body, each of the test samples 7 to 9 has a small value A and a small temperature difference ΔT when compared with the value A and the temperature difference ΔT of test sample 1 having no gap.

Similarly, because each of test samples 10 to 12 has a gap between the outside electrode part and the honeycomb body, each of test samples 10 to 12 has a low value A and a low temperature difference ΔT when compared with those of the test sample 1 having no gap.

According to the experimental results previously described, in the honeycomb structural body equipped with the honeycomb body, each of the positive electrode and the negative electrode is comprised of a plurality of parts. The parts of each electrode are divided to the electrode parts in the circumferential direction of the honeycomb body. The electrical resistivity of each of the divided electrode parts is adjusted according to the distance between the positive electrode and the negative electrode, it is possible to suppress the deviation of electrical resistance value between the electrode pair by the current path through which current flows, and to flow uniform current in the entire of the honeycomb body.

(Other Features of the Present Invention)

In the honeycomb body according to the exemplary embodiment, the cell formation part is comprised of porous partition walls and a plurality of cells. Each of the cells is surrounded by the partition walls. Each of the cells is extended along an axial direction of the honeycomb body.

When the honeycomb structural body is used in the electrically heated catalyst (EHC) device, it is possible for the partition walls of the cell formation part to support three-way catalyst such as such as platinum (Pt), palladium (Pd), rhodium (Rh), etc.

It is preferable that the outside electrode parts are formed at both the ends of the reference electrode part of each of the electrodes forming the electrode pair in the circumferential direction of the honeycomb body. It is preferable for the electrical resistivity of each of the outside electrode parts to be increased toward the outside direction observed from the reference electrode part.

In this structure of the electrode pair, the more the distance between the parts of the electrode pair is decreased, the more the electrical resistivity of the outside electrode part is increased. This makes it possible to suppress the deviation from a uniform distribution of current flowing in the honeycomb body and to allow the current to uniformly flow in the honeycomb body. It is therefore possible for the temperature of the entire of the honeycomb body to increase uniformly.

In the honeycomb body, it is preferable that the electrodes formed on the surface of the honeycomb body have a value A within a range of 0.1 to 10. The value A=((L1−L2)/L1)/((R1−R2)/R1), L1 is a longest distance and L2 is a shortest distance between the electrode pair in a facing direction in which the electrodes face to each other. R1 is an electrical resistance value at the longest distance L1 between the electrodes. R2 is an electrical resistance value at the shortest distance L2 between the electrodes.

This structure of the honeycomb body makes it possible to suppress the deviation from a uniform distribution of current flowing in the honeycomb body, and to flow uniform current in the honeycomb body, and for the temperature of the entire of the honeycomb body to increase uniformly.

It is preferable that each of the electrodes formed on the honeycomb body has the value A within a range of 0.8 to 1.2.

This structure makes it possible to suppress the deviation from a uniform distribution of current flowing in the inside of the honeycomb body and to flow uniform current in the inside of the honeycomb body. It is therefore possible for the temperature of the entire of the honeycomb body to increase uniformly.

A description will now be given of the value A of the honeycomb structural body having the same structure shown in FIG. 1, FIG. 2 and FIG. 3.

As shown in FIG. 13, the longest distance L1 between of the electrode pair is the distance between the central part of the reference electrode part 31 in the positive electrode 3 and the central part of the reference electrode part 41 in the negative electrode 4 in the electrode pair. On the other hand, the shortest distance L2 between of the electrode pair is the distance between the most outside part in the outside electrode part 32a (32b) in the positive electrode 3 and the most outside part in the outside electrode part 42a (42b) in the negative electrode 4.

Next, the electrical resistance value R1 at the longest distance L1 between the electrode pair is detected. Further, the electrical resistance value R2 at the shortest distance L2 between the electrode pair is detected. A current of 1 ampere (1 A) flows between the electrode terminals 30 and 40 of the electrodes 3 and 4. The test leads 81 of the multi-meter 8

The method then detected the value of (R1−R2)/R1. Further, the method calculated the value A which is represented by the equation of A=((L1−L2)/L1)/((R1−R2)/R1). In each of the test samples 1 to 12, the value of (L1−L2)/L1) was 0.22, previously described.

When 1 A current flows between the electrode terminals 30 and 40 of the positive electrode 3 and the negative electrode 4, the test leads 810 of the multi-meter 800 are connected to the positive electrode 3 and the negative electrode 4 (including the reference electrode parts and the outside electrode parts shown in FIG. 13) in order to detect a voltage between the electrodes 3 and 4. The electrical resistance values R1 and R2 are calculated on the basis of the detected voltage. The contact position to which the test leads 810 of the multi-tester 800 are connected are designated by reference characters M11 and M12 when the electrical resistance value R1 is obtained, and are designated by reference characters M21 and M22 when the electrical resistance value R2 is obtained.

In general, when the electrical resistivity and the sectional area are constant, the electrical resistance value is proportional to the distance between the electrodes. Basically, it is possible that the honeycomb body 2 has the constant electrical resistivity and the constant sectional area, the electrical resistance values R1 and R2 are proportional to the distance l1 and L2, respectively. When the electrical resistance values R1 and R2 are proportional to the distance l1 and L2, and the same current flows in the central part and the outside part of the electrodes 3 and 4 (as the ideal state), it is possible for the temperature of the entire of the honeycomb body 2 to increase uniformly. In the ideal state, the value A=((L1−L2)/L1)/((R1−R2)/R1) takes a value of 1.

However, the current flowing in the central part of the electrodes 3 and 4 is usually different from the current flowing in the outside part of the electrodes 3 and 4. When the difference between these current values is more increased, the more the value A is different from the value of 1.

Specifically, when the current more easily flows in the outside part rather than the central part between the positive electrode 3 and the negative electrode 4, and when the electrical resistance value of each of the electrodes 3 and 4 is small, the difference between the electrical resistance values R1 and R2 is small, and the value A is more than the value of 1.

On the other hand, when the current easily flows in the central part rather than in the outside part between the positive electrode 3 and the negative electrode 4 and when the electrical resistance value of each of the electrodes 3 and 4 is large, the difference between the electrical resistance values R1 and R2 is large, and the value A is less than the value of 1.

When the electrical resistivity of each of the electrodes 3 and 4 (containing the reference electrode parts 31, 41 and the outside electrode parts 32a, 32b, 42a and 42b) is adjusted so that the value A more approaches the value of 1, it is possible to suppress the deviation from a uniform distribution of current flowing in the inside of the honeycomb body, and for current to flow uniformly in the honeycomb body, and for the temperature of the entire of the honeycomb body to increase uniformly. Even if the honeycomb body 2 has a different size, it is possible the current in the entire of the honeycomb body to flow uniformly by adjusting the value A to be within the predetermined range of 0.8 to 1.2.

It is preferable that an electrical resistivity of the honeycomb body is larger than the electrical resistivity of each of the reference electrode part and the outside electrode parts. In this structure, because the current flows in the entire of the electrodes 3 and 4, it is possible to ensure the current to flow in the entire of the electrode pair, and for the temperature of the entire of the honeycomb body to increase uniformly.

For example, when the outside electrode parts, whose electrical resistivity is larger than that of the honeycomb body, are formed on the surface of the honeycomb body, the current easily flows in the honeycomb body rather than in the outside electrode parts. This causes a possibility of it being difficult to flow the current in the entire part between the electrode pair. This causes the deviation from a uniform distribution of temperature in the honeycomb body and the difficulty for the temperature of the entire of the honeycomb body to increase uniformly.

It is preferable that the honeycomb body is divided into a plurality of honeycomb parts in a facing direction along which the electrodes face to each other and a direction which is perpendicular to the facing direction. The divided honeycomb parts of the honeycomb body are composed of a reference honeycomb part and a plurality of outside honeycomb parts. The outside honeycomb parts are arranged at each of the end parts of the reference honeycomb part. The electrical resistivity of the reference honeycomb part is smaller than an electrical resistivity of each of the outside honeycomb parts. The reference honeycomb part is arranged least a part of an area between the reference electrode parts of the electrode pair. The outside honeycomb parts are arranged in at least a part between the outside electrode parts of the electrode pair.

This structure of the honeycomb body makes it possible to adjust the electrical resistivity of each of the parts forming the honeycomb body in addition to adjust the electrical resistivity of each of the parts forming the electrode pair. It is therefore possible for the temperature of the entire of the honeycomb body to increase uniformly.

In each of the positive electrode and the negative electrode forming the electrode pair, when a plurality of outside electrode parts are formed at both ends of the reference electrode part, the honeycomb body is divided into the reference honeycomb parts and the plurality of the outside honeycomb parts, and the outside honeycomb parts are arranged at both ends of the reference honeycomb parts, and the electrical resistivity of the outside honeycomb parts is increased toward the outside, similar to the parts of the electrode pair. It is acceptable to place each outside honeycomb part between at least one pair of the outside electrode parts arranged in the facing direction in which the outside electrodes face to each other.

It is preferable that each of the electrodes has a thickness within a range of 0.1 to 5 mm.

This structural condition of the electrode makes it possible to ensure to form each of the electrodes on the outer peripheral surface of the honeycomb body, and to adequately ensure to mount the honeycomb structural body to an exhaust gas purifying system of an internal combustion engine.

For example, when the thickness of each electrode is less than 0.1 mm, there is a possibility of it being difficult to form each of the electrodes on the outer peripheral surface of the outer skin part of the honeycomb body.

On the other hand, when the thickness of each electrode is more than 5 mm, there is a possibility of it being difficult to mount the honeycomb structural body with the honeycomb body into an exhaust gas pipe of the exhaust gas purifying system for the internal combustion engine because this structure makes it difficult to support the honeycomb structural body with uniform force from the outer periphery of an exhaust gas pipe of the exhaust gas purifying system.

Accordingly, it is preferable that each of the electrodes has a uniform thickness within a range of 0.1 to 5 mm in the views of mounting it to the exhaust gas purifying system in addition to the view of easily forming the electrodes on the outer peripheral surface of the outer skin part of the honeycomb body.

It is preferable that each of the electrodes has a gap between the reference electrode part and the outside electrode part placed adjacent to the end of the reference electrode part in the circumferential direction of the honeycomb body.

This structure makes it possible to suppress and relax mechanical stress generated when the honeycomb structural body is stored in an exhaust gas pipe of an exhaust gas purifying system and vibration and thermal stress generated when the motor vehicle drives. This makes it possible to prevent cracks from being generated in the electrodes of the honeycomb structural body.

It is acceptable to further form a gap between the outside electrode parts formed adjacent to each end of the reference electrode part in the circumferential direction of the honeycomb body. This makes it possible to further prevent cracks from being generated in the positive electrode and the negative electrode of the honeycomb structural body.

It is possible to have a structure in which a gap is formed between the outside electrode part and the honeycomb body.

This structure having the gap makes it possible to adjust the electrical resistance value of each of the outside electrode part. Specifically, this structure makes it possible to decrease the magnitude of current flowing in the outside electrode parts because this structure can adjust the electrical resistance value of each of the outside electrode parts. It is therefore possible to further suppress the deviation from a uniform distribution of current flowing in the inside of the honeycomb body.

For example, it is possible to use, as electrode material, ceramics containing silicon carbide SiC or SiC—Si (in which metallurgical silicon (Si) is impregnated in SiC), metal such as Cr, Fe, Ni, Mo, Mn, Si, Ti, Nb, Al or metallic alloy thereof.

Because the electrical resistivity of the electrode is very low when the above metal is used as electrode material, it is generally difficult to adjust the electrical resistivity of each of the reference electrode and the outside electrode part forming each electrode when compared with to adjust them when the above ceramics is used as the electrode material. Therefore it is preferable to use the above ceramics as the electrode material.

There are various methods of adjusting the electrical resistivity of the reference electrode part and the outside electrode parts in each of the positive electrode and the negative electrode forming the electrode pair. For example, one of the methods adjusts a compositional ratio, a density, etc., of the reference electrode part and the outside electrode parts.

For example, there is a method of controlling quantity of impurity, etc., contained in electrode material of the electrodes in order to adjust the electrical resistivity of each of the electrode parts forming each electrode.

Specifically, when silicon carbide SiC is used as electrode material, the method adjusts the quantity of impurity such as N, B, Al, etc. in a solid solution of silicon carbide SiC in order to adjust the electrical resistivity of each of the parts forming each electrode.

When SiC—Si is used as electrode material, the method adjusts the quantity of metallurgical silicon (Si) as impurity in SiC—Si in order to adjust the electrical resistivity of each of the electrode parts forming each electrode.

It is also possible to combine the above methods in order to adjust the electrical resistivity of each of the electrode parts forming each electrode.

There is a method of adjusting the density of electrode material in order to adjust the electrical resistivity of each of the electrode parts forming each electrode. For example, the method adjusts the quantity of organic material containing the electrode material.

Specifically, organic material (such as resin) is added into electrode material, and the resin is removed by firing the electrode material. The final density (porosity) of the electrode is adjusted by changing the quantity of resin in order to adjust the electrical resistivity of the electrode parts (such as the reference electrode part and the outside electrode parts) forming the electrode.

There are various methods of adjusting the electrical resistivity of the reference honeycomb part and the outside honeycomb parts which form the honeycomb body. One of the methods adjusts a compositional ratio, a density, etc., of the reference honeycomb part and the outside honeycomb parts which form the honeycomb body.

For example, there is the method of controlling the quantity of impurity, etc. contained in material of the honeycomb body in order to adjust the electrical resistivity of each of the honeycomb parts forming the honeycomb body.

Specifically, when silicon carbide SiC is used as honeycomb material, the method adjusts the quantity of impurity such as N, B, Al, etc. in a solid solution of silicon carbide SiC in order to adjust the electrical resistivity of each of the honeycomb parts forming the honeycomb body.

When SiC—Si is used as honeycomb material, the method adjusts the quantity of metallurgical silicon (Si) as impurity in SiC—Si in order to adjust the electrical resistivity of each of the honeycomb parts forming the honeycomb body.

It is also possible to combine the above methods in order to adjust the electrical resistivity of each of the honeycomb parts forming the honeycomb body.

There is a method of adjusting the density of honeycomb material in order to adjust the electrical resistivity of each of the honeycomb parts forming the honeycomb body. For example, the method adjusts the quantity of organic material containing the honeycomb material.

Specifically, organic material (such as resin) is added into honeycomb material, and the resin is removed by firing the honeycomb material. The final density (porosity) of the honeycomb body is adjusted by changing the quantity of resin in order to adjust the electrical resistivity of the honeycomb parts (such as the reference honeycomb part and the outside honeycomb parts) forming the honeycomb body.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A honeycomb structural body comprising:
a honeycomb body comprised of a cell formation part and an outer skin part of a cylindrical shape, the outer skin part covering the cell formation part; and
a pair of electrodes formed on an outer peripheral surface of the outer skin part so that the electrodes face to each other in a diameter direction of the honeycomb body,
wherein each of the electrodes comprises a reference electrode part formed at a central part of the electrode in a circumferential direction of the honeycomb body, one or more outside electrode parts formed at both ends of the reference electrode part, an electrode terminal is formed on the reference electrode part of each of the electrodes, the reference electrode part of one electrode and the reference electrode part of the other electrode face each other in a radial direction of the honeycomb body, and the outside electrode parts of one electrode face the outside electrode parts of the other electrode in a radial direction of the honeycomb body, and
an electrical resistivity of the reference electrode part is smaller than an electrical resistivity of each of the outside electrode parts in each of the electrodes, wherein
each of the electrodes has a gap between the reference electrode part and the outside electrode part placed adjacent to the end of the reference electrode part in the circumferential direction of the honeycomb body.

2. The honeycomb structural body according to claim 1, wherein the outside electrode parts are formed at both the ends of the reference electrode part of each of the electrodes forming the electrode pair in the circumferential direction of the honeycomb body, and the electrical resistivity of each of the outside electrode parts is increased toward the outside direction observed from the reference electrode part.

3. The honeycomb structural body according to claim 1, wherein the electrodes formed on the honeycomb body have a value A within a range of 0.1 to 10, where $A=((L1-L2/L1)/((R1-R2)/R1)$, L1 is a longest distance and L2 is a shortest distance between the electrode pair in a facing direction in which the electrodes face to each other through the honeycomb body, R1 is an electrical resistance value at the longest distance L1 between the electrodes, and R2 is an electrical resistance value at the shortest distance L2 between the electrodes.

4. The honeycomb structural body according to claim 3, wherein each of the electrodes formed on the honeycomb body has the value A within a range of 0.8 to 1.2.

5. The honeycomb structural body according to claim 1, wherein an electrical resistivity of the honeycomb body is larger than the electrical resistivity of each of the reference electrode part and the outside electrode parts.

6. The honeycomb structural body according to claim 1, wherein the honeycomb body is divided into a plurality of parts in a facing direction along which the electrodes face to each other and a direction which is perpendicular to the facing direction, and the divided parts of the honeycomb body are composed of a reference honeycomb part and a plurality of outside honeycomb parts, the outside honeycomb parts are arranged at each of the end parts of the reference honeycomb part, and an electrical resistivity of the reference honeycomb part is smaller than an electrical resistivity of each of the outside honeycomb parts, and the reference honeycomb part is arranged in at least a part of an area between the reference electrode parts of the electrode pair, and the outside honeycomb parts are arranged in at least a part between the outside electrode parts of the electrode pair.

7. The honeycomb structural body according to claim 1, wherein each of the electrodes has a thickness within a range of 0.1 to 5 mm.

8. An electrically heated catalyst device comprising:
the honeycomb structural body according to claim 1;
catalyst supported in the honeycomb body; and
electric power supplying means configured to supply electric power to the electrode pair.

* * * * *